(12) United States Patent
Temmyo et al.

(10) Patent No.: US 6,598,410 B2
(45) Date of Patent: Jul. 29, 2003

(54) REFRIGERATOR WITH A PLURALITY OF PARALLEL REFRIGERANT PASSAGES

(75) Inventors: Minoru Temmyo, Ibaraki (JP); Masato Tago, Ibaraki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/095,088

(22) Filed: Mar. 12, 2002

(65) Prior Publication Data

US 2002/0134095 A1 Sep. 26, 2002

(30) Foreign Application Priority Data

Mar. 21, 2001 (JP) .......................... 2001-080580

(51) Int. Cl.⁷ .............................. B25D 17/00; B25D 5/00
(52) U.S. Cl. ............................... 62/179; 62/199
(58) Field of Search .................... 62/179, 181, 199, 62/228.4

(56) References Cited

U.S. PATENT DOCUMENTS

| | | | |
|---|---|---|---|
| 4,513,581 A | 4/1985 | Mizobuchi et al. | |
| 5,150,583 A | * 9/1992 | Jaster et al. | ................... 62/179 |
| 5,465,591 A | 11/1995 | Cur et al. | |
| 6,438,978 B1 | * 8/2002 | Bessler et al. | ................ 62/179 |

FOREIGN PATENT DOCUMENTS

| | | |
|---|---|---|
| EP | 0602379 A2 | 6/1994 |
| EP | 0859206 A2 | 8/1998 |
| EP | 0987507 A2 | 3/2000 |
| EP | 0990862 A1 | 4/2000 |
| EP | 1030133 A1 | 8/2000 |

* cited by examiner

*Primary Examiner*—William Wayner
(74) *Attorney, Agent, or Firm*—Pillsbury Winthrop LLP

(57) ABSTRACT

A refrigerator has a cold storage and freezer zones with individual fans and evaporators, a switching valve that allows refrigerant to flow simultaneously through each zone or through only one of the zones and a control which when power is supplied causes simultaneous flow, starting the compressor and a condenser fan while driving the cold storage fan at a high speed and the freezing zone fan at a low speed until such time that a set point time has been exceeded or the temperature set points of the zones has been reached by cooling.

21 Claims, 19 Drawing Sheets

REFRIGERATOR WITH A PLURALITY OF PARALLEL REFRIGERANT PASSAGES

BACKGROUND OF THE INVENTION

1. Field of the Invention

This invention relates to a refrigerator including a cold storage zone evaporator, a freezing zone evaporator, a first passage through which refrigerant is caused to flow into the cold storage zone evaporator and a second passage through which the refrigerant is caused to flow into the freezing zone evaporator, the first and second passages being in parallel with each other.

2. Description of the Related Art

There have conventionally been provided household refrigerators having a cold storage zone 1 and a freezing zone 2 as shown in FIG. 18. The zones 1 and 2 are divided by a heat insulation partition wall 3. The cold storage zone 1 is further divided by a partition plate 4 into an upper cold storage compartment 1a and a lower vegetable compartment 1b. Only a freezing compartment 2a is defined in the freezing zone 2.

A cold storage component compartment 5 is defined deep in the vegetable compartment 1b in the cold storage zone 1. An evaporator 6, a fan 7 and an electric heater 8 all for the cold storage zone are disposed in the cold storage component compartment 5. A refrigerating component compartment 9 is defined deep in the freezing compartment 2a in the freezing zone 2. An evaporator 10, a fan 11 and an electric heater 12 are also disposed in the freezing component compartment 9. Air in the cold storage zone 1 is circulated by the fan 7 while in contact with the evaporator 6, as shown by arrows in FIG. 18. Air in the freezing zone 2 is also circulated by the fan 11 while in contact with the evaporator 10, as shown by arrows in FIG. 18. Thus, both fans 7 and 11 are for air circulation in the refrigerator. The heater 8 dissolves frost adherent to the evaporator 6 thereby to remove the frost. The heater 12 also dissolves frost adherent to the evaporator 10 thereby to remove the frost. Thus, the heaters 8 and 12 are for defrosting. A machine compartment 13 is provided in a lowest rear of the refrigerator. A compressor 14 is disposed in the machine compartment 13.

FIG. 19 shows an exemplified arrangement of equipment composing a refrigerating cycle for the foregoing refrigerator. A refrigerant is circulated through the equipment so that the refrigerating cycle is carried out. In the shown refrigerating cycle, the two evaporators are individually provided for the cold storage and freezing zones 1 and 2 respectively and connected in parallel with each other. The refrigerant is compressed by the compressor 14 into a high-temperature high-pressure gas, which enters a condenser 15. The condenser 15 is cooled by a heat-dissipating fan (not shown) such that the refrigerant is cooled into an ordinary temperature high-pressure liquid. The liquefied refrigerant is introduced from the condenser 15 into a three-way valve 16 having one entrance and two exits. A capillary tube 17 for the cold storage zone is connected to one of the exits, whereas a capillary tube 19 for the freezing zone is connected to the other exit. The valve 16 switches the direction of the refrigerant between a case where an atmosphere in the cold storage zone 1 is cooled and a case where an atmosphere in the freezing zone 2 is cooled.

FIG. 20 shows a flow of the refrigerant by way of arrows in the case where the atmosphere in the cold storage zone 1 is cooled. In this case, the refrigerant flowing out of the condenser 15 enters the cold storage zone capillary tube 17 by the switching of the valve 16. The refrigerant passes through the capillary tube 17 to be introduced into the cold storage zone evaporator 16. The capillary tube 17 reduces the pressure of an ordinary temperature high-pressure liquid refrigerant so that the refrigerant fed to the evaporator 16 is easily evaporated. The capillary tube 17 also controls a flow rate of the liquid refrigerant. The refrigerant having entered the evaporator 6 evaporates into a gaseous refrigerant. During evaporation, an ambient heat is absorbed so that the evaporator 6 is cooled. The cold storage zone fan 7 is operated so that air in the cold storage zone 1 is circulated while in contact with the cooled evaporator 6, whereupon the atmosphere in the cold storage zone 1 is cooled. The liquid refrigerant evaporates in the evaporator 6 into gaseous refrigerant, which is returned through a suction pipe 18 into the compressor 14 to be re-compressed.

On the other hand, the refrigerant flows through a path as shown by arrows in FIG. 21 when the atmosphere in the freezing zone 2 is cooled. More specifically, the refrigerant flowing out of the condenser 15 further flows through the three-way valve 16 into a capillary tube 19 for the freezing zone. The refrigerant further flows through the capillary tube 19 into the freezing zone evaporator 10. In the evaporator 10, the refrigerant evaporates into a gaseous refrigerant. The evaporator 10 is cooled during the evaporation. Thereafter, the refrigerant returns through a check valve 20 and the suction pipe 18 into the compressor 14. An accumulator (not shown) may or may not be provided between the freezing zone evaporator 10 and the check valve 20. Thus, the refrigerating cycle as shown in FIG. 19 has a passage through which the refrigerant flows so that the atmosphere in the cold storage zone is cooled and a passage through which the refrigerant flows so that the atmosphere in the freezing zone is cooled, both passages being in parallel with each other. The three-way valve 16 switches between the passages.

A temperature in the freezing zone 2 is required to be lower than a temperature in the cold storage zone 1. For this purpose, an evaporating temperature at which the refrigerant evaporates in the freezing zone evaporator 10 should be lower than an evaporating temperature at which the refrigerant evaporates in the cold storage zone evaporator 6. An evaporating pressure needs to be reduced in order that the evaporating temperature of the refrigerant may be reduced. Accordingly, the freezing zone capillary tube 19 is throttled more than the cold storage zone capillary tube 17 so that the refrigerant having passed through the capillary tube 19 evaporates at a lower pressure and a lower temperature. The check valve 20 prevents the refrigerant from flowing into the freezing zone evaporator having a lower temperature to be re-condensed.

On the other hand, conventional refrigerators have been provided including a single evaporator used to cool both the cold storage and freezing zone evaporators although not shown in the drawings. Other conventional refrigerators have further been provided including two evaporators for the cold storage zone and freezing zones respectively, although the evaporators are not shown in the drawings. The evaporators are connected in series to each other. In these conventional refrigerators, atmospheres in both of the cold storage and freezing zones are cooled simultaneously.

However, in the foregoing refrigerators with parallel connected evaporators 6 and 10, the valve 16 is switched so that the refrigerant flows selectively through one of the evaporators 6 and 10. Accordingly, the atmospheres in the cold storage and freezing zones 1 and 2 are only cooled alternately. Accordingly, when electric power is supplied to the refrigerator with its interior not being sufficiently cooled, it takes a long time to cool the interiors of the compartments in both cold storage and freezing zone 1 and 2 so that respective set temperatures are reached. For the purpose of solving this problem, the refrigerant is caused to flow simultaneously into both evaporators while atmospheres in the compartments are not sufficiently cooled. In this case, however, since an amount of refrigerant circulated is increased, there are possibilities that the compressor 14 may be overloaded, that the temperature of the condenser 15 may be increased excessively, that a cooling operation for either one of the cold storage and freezing zones 1 and 2 may be retarded relative to the other to a large extent, and so forth.

SUMMARY OF THE INVENTION

Therefore, an object of the invention is to provide a refrigerator in which a refrigerating cycle includes two parallel connected passages through which the refrigerant flows into the cold storage zone evaporator and the freezing zone evaporator respectively and in which atmospheres in both the cold storage and freezing compartments can be cooled as quickly as possible without the refrigerating cycle being overloaded and without any other problems so that predetermined temperatures are reached in the cold storage and freezing zones respectively, after power supply to the refrigerator.

To achieve the object, the present invention provides a refrigerator provided with a cold storage zone and a freezing zone both defined therein, comprising a compressor for compressing a refrigerant, a condenser provided with a heat-dissipating fan, a first passage including a cold storage zone capillary tube and a cold storage zone evaporator, the latter two being connected in series to each other, a second passage including a freezing zone capillary tube and a freezing zone evaporator, the latter two being connected in series to each other, a switching valve causing the refrigerant condensed by the condenser to flow selectively through any one of the first passage, the second passage and both the first and second passages, a variable speed, cold storage zone fan circulating air in the cold storage zone while the air is in contact with the cold storage zone evaporator, a variable speed, freezing zone fan circulating air in the freezing zone while the air is in contact with the freezing zone evaporator, and control means. The control means switches the switching valve upon power supply to the refrigerator so that the refrigerant flows through both the first and second passages. The control means starts the cold storage zone fan so that said fan is driven at a high speed. The control means further starts the freezing zone fan so that said fan is driven at a lower speed than the cold storage zone fan and the heat-dissipating fan so that an operation in which atmospheres in both the cold storage and freezing zones are simultaneously cooled is continued until a temperature or temperatures in the cold storage and/or freezing storage zone decreases to a value or values smaller than a predetermined value or values, respectively or until a predetermined period of time elapses after the power supply to the refrigerator. The control means thereafter executes a normal operation mode.

Upon power supply to the refrigerator, the refrigerant flows through both the first and second passages. Accordingly, both the cold storage and freezing zones are simultaneously cooled. Furthermore, since rotational speeds of the cold storage and freezing zone fans are adjusted, the refrigerating cycle can be prevented from an overloaded condition and the atmospheres in both zones can be cooled for substantially the same period of time so that the respective set temperatures are reached.

BRIEF DESCRIPTION OF THE DRAWINGS

Other objects, features and advantages of the present invention will become clear upon reviewing the following description of embodiments, made with reference to the accompanying drawings, in which.

DETAILED DESCRIPTION OF EMBODIMENTS

Figure 1:
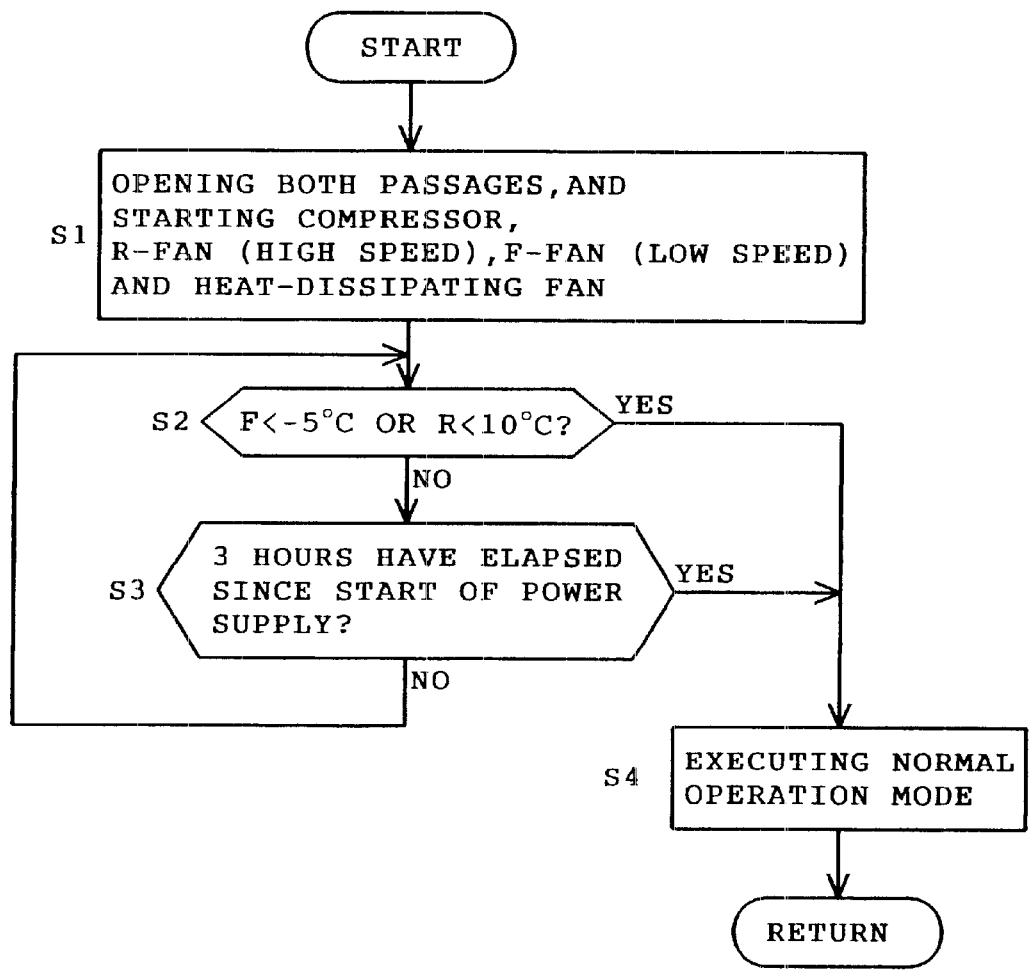
FIG. 1 is a flowchart showing a cooling sequence employed in a refrigerator of a first embodiment in accordance with the present invention.
Figure 2:
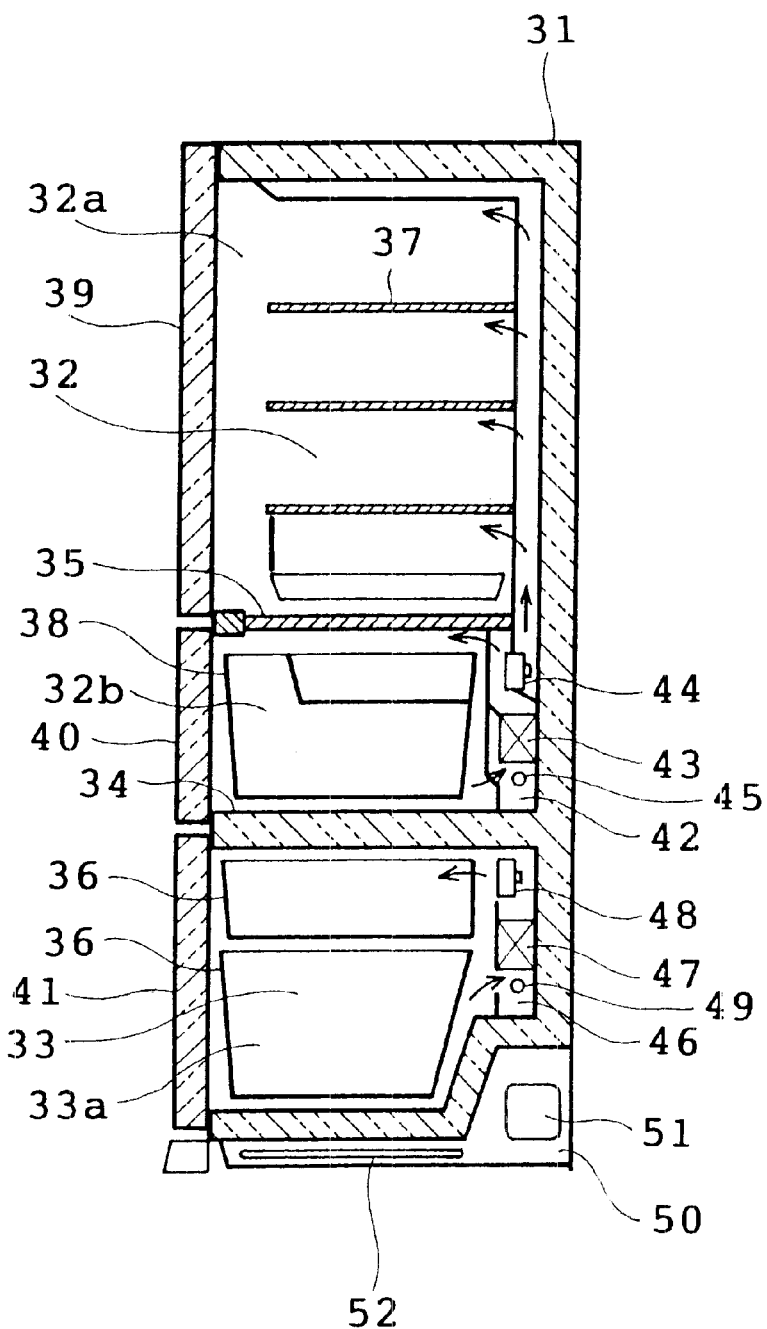
FIG. 2 is a longitudinal side section of the refrigerator.

Several embodiments of the invention will be described. A first embodiment of the invention will now be described with reference to FIGS. 1 to 7. Referring first to FIG. 2, an overall construction of the refrigerator of the first embodiment is shown. The refrigerator comprises a heat-insulated cabinet 31 in which an upper cold storage zone 32 and a lower freezing zone 33 are defined by a heat-insulating partition wall 34. The cold storage zone 32 is further divided by a partition plate 35 into an upper cold storage compartment 32a and a lower vegetable compartment 32b. Only a freezing compartment 33a is defined in the freezing zone 33. The freezing compartment 33a is provided with two storage receptacles 36. The cold storage compartment 32a is provided with shelves 37. The vegetable compartment 32b is provided with a storage receptacle 38. These compartments 32a, 32b and 33a are further provided with doors 39, 40 and 41 respectively. A cold storage component compartment 42 is defined deep in the vegetable compartment 32b. A cold storage zone evaporator 43, fan 44 and electric heater 45 are disposed in the cold storage component compartment 42. A freezing component compartment 46 is defined deep in the freezing compartment 33a. A freezing zone evaporator 47, fan 48 and electric heater 49 are disposed in the freezing component compartment 46.

Air in the cold storage zone 32 is circulated by the fan 44 while in contact with the evaporator 43, as shown in arrows in FIG. 2. Air in the freezing zone 33 is also circulated by the fan 48 while in contact with the evaporator 47, as shown by arrows in FIG. 2. Thus, both fans 44 and 48 are for air circulation in the refrigerator. Rotational speeds of the fans 44 and 48 are individually adjustable. The heater 45 dissolves frost adherent to the evaporator 43 thereby to remove the frost. The heater 49 also dissolves frost adherent to the evaporator 47 thereby to remove the frost. Thus, the heaters 45 and 49 are for defrosting. A machine compartment 50 is provided in a lowest rear of the refrigerator. A compressor 51 is disposed in the machine compartment 50. A variable rotational speed rotary compressor is used as the compressor 51.

Figure 3:
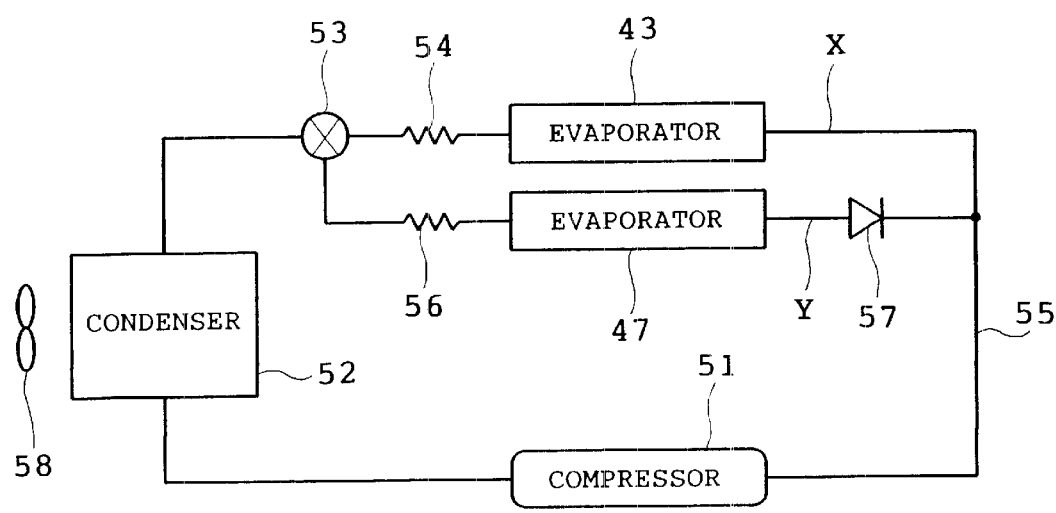
FIG. 3 is a connection diagram showing a refrigerating cycle for the refrigerator of the first embodiment.

FIG. 3 shows components of a refrigerating cycle for the refrigerator and a connection of the components. A refrigerant is caused to flow through the components so that a refrigerating cycle is carried out. A condenser 52 is connected to an exit of the compressor 51. A valve 53 is connected to an exit of the condenser 52. The valve 53 is a three-way valve having one entrance connected to the condenser 52 and two exits. The cold storage zone evaporator 43 is connected via a cold storage zone capillary tube 54 to one of the exits of the valve 53. An exit of the evaporator 43 is connected via a suction pipe 55 to the compressor 51. A passage passing through the capillary tube 54 and the evaporator 43 is referred to as "first passage X." The freezing zone evaporator 47 is connected via a freezing zone capillary tube 56 to the other exit of the valve 53. An exit of the evaporator 47 is connected via a check valve 57 to the suction pipe 55. A passage passing through the capillary tube 56 and the evaporator 47 is referred to as "second passage Y."

In the refrigerating cycle as shown in FIG. 3, the two evaporators 43 and 47 are provided for the cold storage zone 32 and the freezing zone 33 respectively. The first passage X includes the cold storage zone evaporator 43 and the second passage Y includes the freezing zone evaporator 47. The first and second passages X and Y are connected in parallel to each other. An accumulator (not shown) may or may not be connected between the evaporator 47 and the check valve 57.

Upon drive of the compressor 51, the refrigerant is compressed into a high-temperature, high-pressure gas, flowing into the condenser 52. The condenser 52 is cooled by a heat-dissipating fan 58 such that the refrigerant changes into a normal temperature, high pressure liquid. The liquid refrigerant flows through the condenser 52 into the valve 53. The valve 53 is switched so that only the first passage X, only the second passage Y or both first and second passages X and Y are selected. When the first passage X is selected, the refrigerant flows into the cold storage zone capillary tube 54. A mass flow of the refrigerant is reduced in the capillary tube 54 and thereafter, the refrigerant evaporates in the evaporator 43 into a gas. The gaseous refrigerant flows through the suction pipe 55, returning to the compressor 51. When the second passage Y is selected, the refrigerant flows into the freezing zone capillary tube 56. The mass flow of the refrigerant is reduced in the capillary tube 56 and thereafter, the refrigerant evaporates in the evaporator 47 into a gas. The gaseous refrigerant flows through the check valve 57 and suction pipe 57, returning to the compressor 51.

The liquid refrigerant absorbs ambient heat when evaporating in the cold storage and freezing zone evaporators into the gas. As a result, surface temperatures of the evaporators 43 and 47 are reduced such that air brought into contact with the evaporators is cooled. Thus, cooled air is circulated in the refrigerator by the fans 44 and 48, so that atmospheres in the cold storage and freezing zones 32 and 33 are cooled. In refrigerators, the temperature in the cold storage zone 32 is maintained at or above the freezing point, and the temperature in the freezing zone 32 is maintained below the freezing point. Accordingly, the temperature in the freezing zone 33 needs to be lower than that in the cold storage zone 32. For this purpose, an evaporating temperature of the refrigerant in the freezing zone evaporator 47 should be lower than an evaporating temperature of the refrigerant in the cold storage zone evaporator 43. In order that the evaporating temperature of the refrigerant may be reduced, pressure needs to be reduced during evaporation. Accordingly, a reduction in the mass flow of the refrigerant is higher in the freezing zone capillary tube 56 than in the cold storage zone capillary tube 54. As a result, the refrigerant having passed through the freezing zone capillary tube 56 is caused to evaporate at a lower pressure and at a lower temperature. The condenser 52 is provided with a heat-dissipating fan 58 for dissipating heat therefrom. The fan 58 is of a variable speed type in which a rotational speed thereof can be changeable. A part of the condenser 52 is disposed beneath the bottom of the cabinet 31 as shown in FIG. 2, whereas the other part (not shown) of the condenser 52 is embedded in peripheral walls of the cabinet 31.

Figure 4:
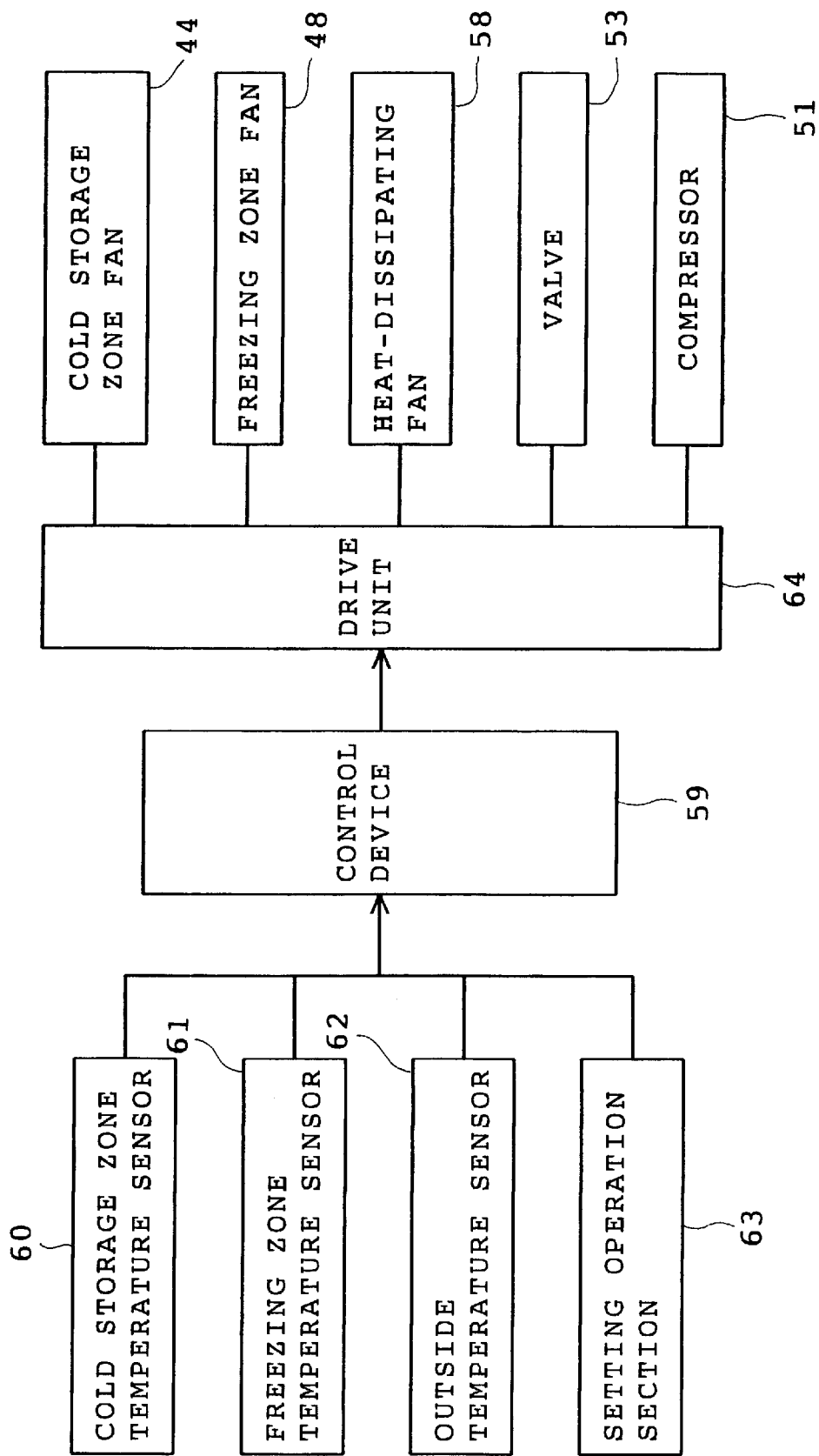
FIG. 4 is a schematic block diagram showing an electrical arrangement of the refrigerator.

FIG. 4 shows an electrical arrangement of control means of the refrigerator. A control device 59 controls an overall operation of the refrigerator and includes a microcomputer (not shown). A cold storage zone temperature sensor 60 is provided for detecting a temperature in the cold storage zone 32. A freezing zone temperature sensor 61 is provided for detecting a temperature in the freezing zone 33. An outside air temperature sensor 62 is further provided for detecting an air temperature outside the cabinet 31. These temperature sensors 60 to 62 are connected to the control device 59. Further, a setting operation section 63 comprises switches for setting temperatures in the zones in the refrigerator and switches for inputting other instructions although none of these switches are shown.

The sensors 60 to 62 deliver respective temperature signals, which are supplied to the control device 59. The setting operation section 63 also delivers setting signals, which are supplied to the control device 59. Based on the supplied signals, the control device 59 executes a control program stored therein to deliver, to a driver 64, command signals to drive the fans 44, 48 and 58, the valve 53 and the compressor 51.

Figure 5:
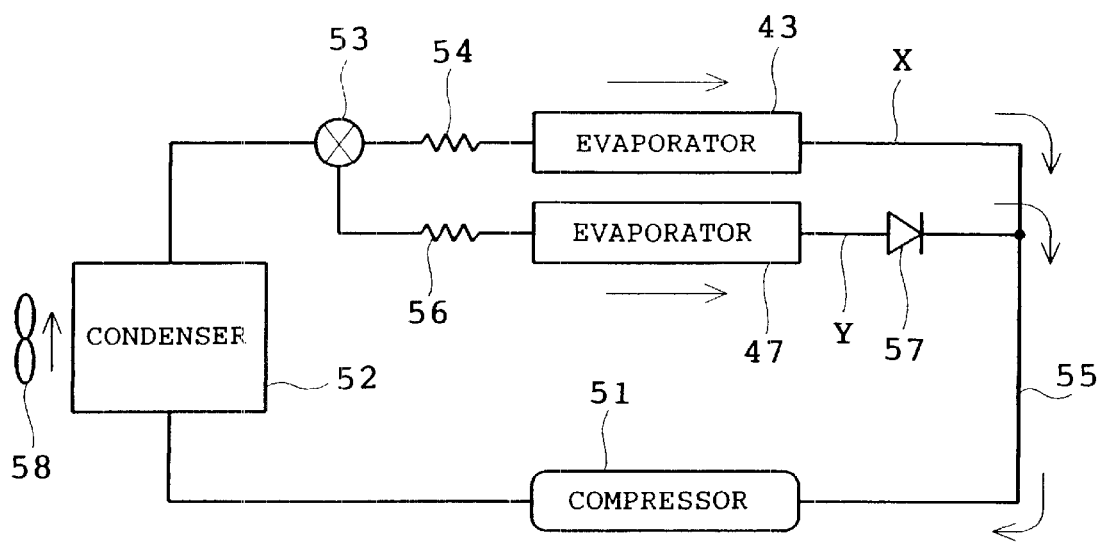
FIG. 5 is a connection diagram showing a flow of refrigerant in a case where both cold storage and freezing zones are simultaneously cooled.

A cooling sequence executed by the control device 59 will now be described. FIG. 1 shows a part of the cooling sequence from power supply to a stage before start of a normal operating mode. Upon power supply to the refrigerator, the control device 59 executes step S1. At step S1, the control device 59 switches the valve 53 so that the refrigerant flows through both of the first and second passages X and Y as shown in FIG. 5. The control device 59 then starts the compressor 51 and the heat-dissipating fan 58. The control device 59 further drives the cold storage zone fan or R-fan 44 at a high speed (for example, 2000 rpm) and the freezing zone fan or F-fan 48 at a low speed (for example, 1500 rpm).

The control device 59 then advances to step S2 to determine whether the temperature in the freezing zone 33 is lower than a predetermined temperature (for example, −5° C.) and/or whether the temperature in the cold storage zone 32 is lower than a predetermined temperature (for example, 10° C.). When neither condition is met, the control device 59 advances to step S3. At step S3, the control device 59 determines whether a predetermined time (for example, 3 hours) has elapsed since the start of operation or power supply. When determining that the predetermined time has not elapsed, the control device 59 returns to step S2 to repeat the foregoing determination.

Figure 6:
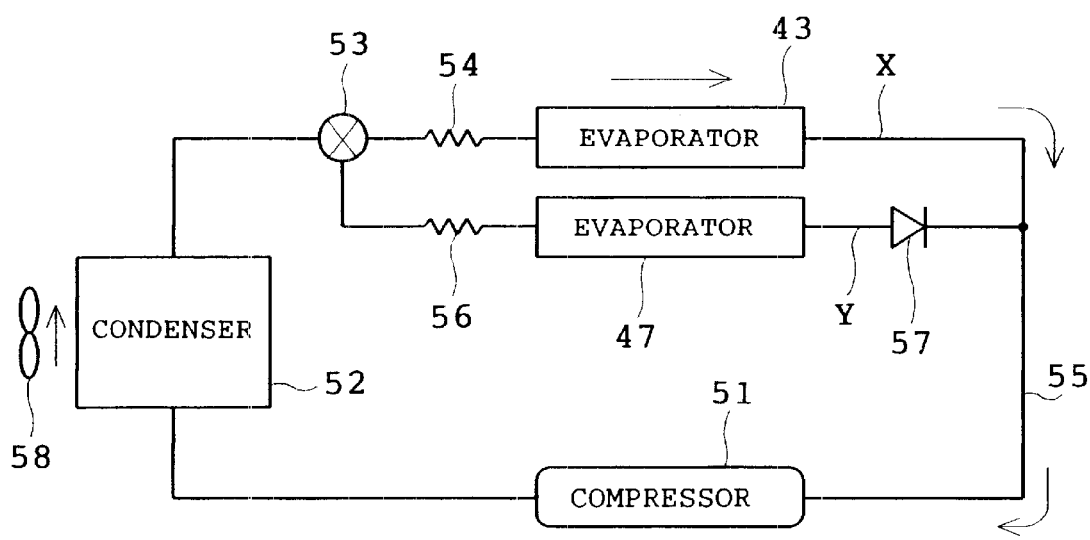
FIG. 6 is a connection diagram showing a flow of refrigerant in a case where the cold storage zone is cooled.
Figure 7:
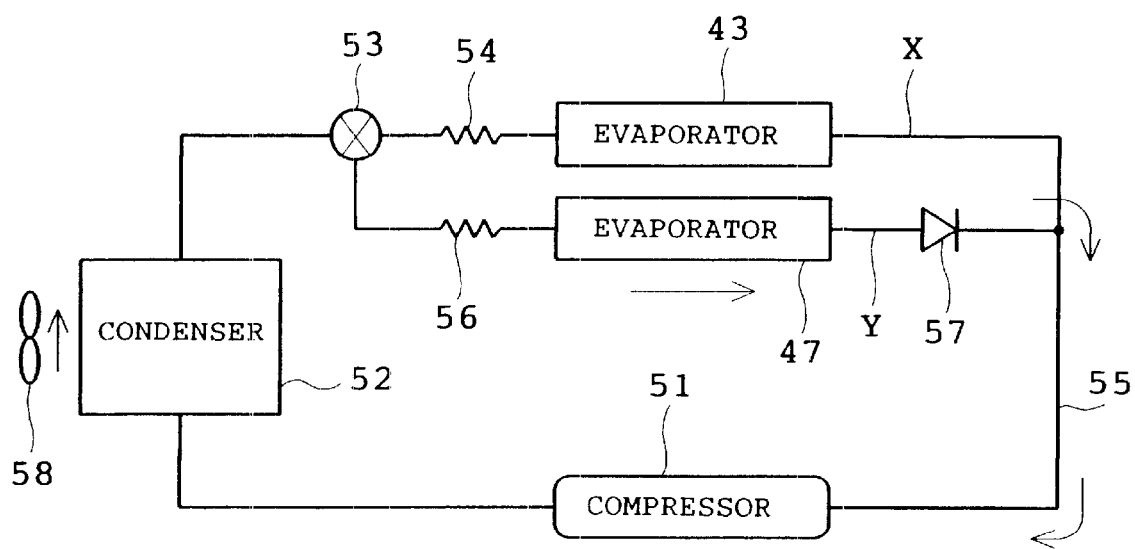
FIG. 7 is a connection diagram showing a flow of refrigerant in a case where the freezing zone is cooled.

The control device 59 advances to step S4 when determining in the affirmative at step S2 or S3. At step S4, the control device 59 stops the refrigerant flowing through the first and second passages X and Y, and executes a sequence for a normal operation mode. In the normal operation mode, cooling is carried out so that the set temperatures are maintained in the cold storage and freezing zones respectively. Various cooling sequences are provided for the normal operation mode. In one of the most frequently executed sequences, the valve 53 is controlled so that flow of refrigerant only into the first passage X as shown in FIG. 6 and flow of refrigerant only into the second passage Y are alternately executed as shown in FIG. 7. In the normal operation mode, the fans 44 and 48 are driven at rotational speeds according to the set temperatures for the cold storage and freezing zones 32 and 33 respectively. Furthermore, a rotational speed of the compressor 51 is controlled so that temperatures in the cold storage and freezing zones 32 and 33 correspond with the set temperatures respectively.

According to the first embodiment, the cooling operation is carried out for both of the cold storage and freezing zones 32 and 33 until the predetermined temperatures are reached in both zones or until the predetermined time elapses after the power supply. Consequently, the temperatures in both zones can quickly be reduced, and the normal operation mode can be initiated a short time after the power supply.

The starting speed of the cold storage zone fan 44 is higher than the starting speed of the freezing zone fan 48 at step S1, as described above. The reason for this is that the temperature in the cold storage zone 32 should be rendered higher than the temperature in the freezing zone 33. Accordingly, the throttling of the cold storage zone capillary tube 54 is lower than the throttling of the freezing zone capillary tube 56 or the opening of the capillary tube 54 is larger than the opening of the capillary tube 56. In other words, the mass flow of refrigerant in the cold storage zone 32 is higher than the mass flow of refrigerant in the freezing zone 33. As a result, more refrigerant flows into the cold storage zone evaporator 43 than into the freezing zone evaporator 47. When the refrigerant cannot absorb a sufficient amount of heat by the heat exchange, the refrigerant cannot completely evaporate in the evaporator. In this case, part of the refrigerant sometimes returns to the compressor in the liquid state, damaging the compressor. In view of this problem, the rotational speed of the cold storage zone fan 44 is increased so that an amount of heat exchanged between air in the cold storage zone and the evaporator is increased, whereby the refrigerant completely evaporates in the cold storage zone evaporator 43 into a gas. Additionally, an amount of heat exchanged in each evaporator can correspond to an amount of refrigerator flowing through each evaporator when the fan 44 for the cold storage zone into which a larger amount of refrigerant is caused to flow is driven at high speeds and the fan for the freezing zone into which a smaller amount of refrigerant is caused to flow is driven at low speeds. Consequently, the interior of the refrigerator can efficiently be cooled.

The control device 59 determines, at step S2, whether the temperature in either zone 32 or 33 is equal to or lower than the respective predetermined temperature, as described above. However, the control device 59 may determine whether the temperatures in both zones 32 and 33 are equal to or lower than the predetermined temperatures respectively, instead.

Figure 8:
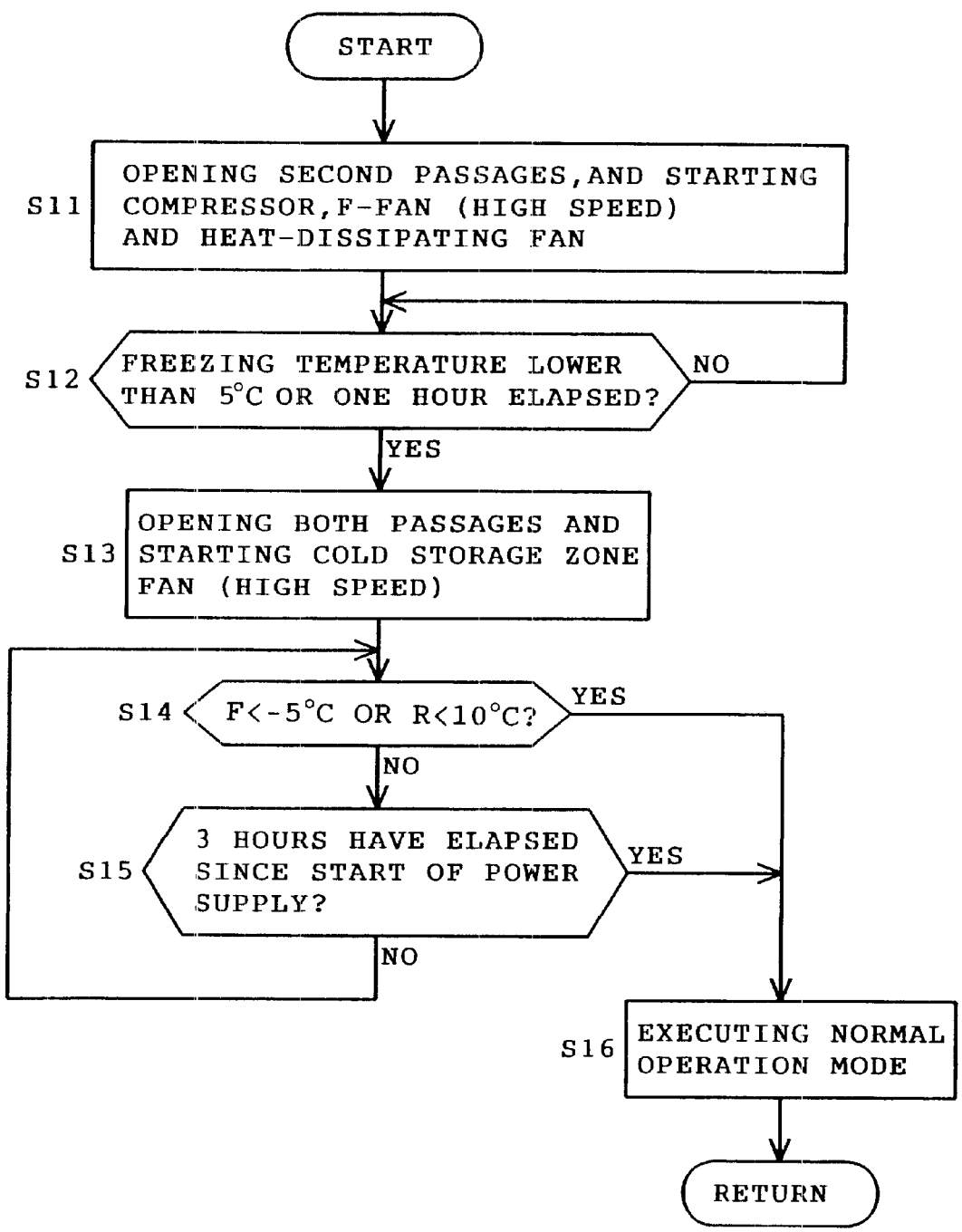
FIG. 8 is a view similar to FIG. 1, showing the refrigerator of a second embodiment in accordance with the invention.

FIG. 8 shows a second embodiment of the invention. The second embodiment differs from the previous embodiment in the cooling sequence. The other mechanical construction and electrical arrangement of the refrigerator are the same as those in the first embodiment. Accordingly, only the cooling sequence will be described with reference to FIG. 8. Upon power supply to the refrigerator, the control device 59 executes step S11. More specifically, the control device 59 switches the valve 53 so that the refrigerant flows only into the second passage Y as shown in FIG. 7. The control device 59 further starts the compressor 51 and the fan 58. Additionally, the control device 59 drives the freezing zone fan 48 (F-fan) at a high speed (for example, 2000 rpm).

The control device 59 then advances to step S12 to determine whether the temperature in the freezing zone 33 is lower than the predetermined temperature (for example, −5° C.) or whether the predetermined time (for example, 1 hour) has elapsed since the start of operation or power supply. When neither condition has been met, the control device 59 returns to step S12 to repeat the foregoing determination. On the other hand, when either one of the conditions has been met, the control device 59 advances to step S13 to switch the valve 53 so that the refrigerant flows simultaneously to both passages X and Y as shown in FIG. 5. At the same time, the control device 59 starts the cold storage zone fan or R-fan 44 at high speed (for example, 2000 rpm).

The control device 59 then advances to step S14 to determine whether the temperature in the freezing zone 33 is lower than the predetermined temperature (for example, −5° C.) and/or whether the temperature in the cold storage zone 32 is lower than the predetermined temperature (for example, 10° C.). When neither condition is met, the control device 59 advances to step S15. At step S15, the control device 59 determines whether the predetermined time (for example, 3 hours) has elapsed since the start of operation or power supply. When determining that the predetermined time has not elapsed, the control device 59 returns to step S14 to repeat the foregoing determination.

The control device 59 advances to step S16 when determining in the affirmative at step S14 or S15. At step S16, the control device 59 operates in the same manner as at step S4 in the first embodiment. More specifically, the control device 59 stops the refrigerant flowing through the first and second passages X and Y, and executes a sequence for a normal operating mode. The normal operating mode is the same as that described in the first embodiment.

According to the second embodiment, the control device 59 starts cooling the atmospheres in both zones 32 and 33 after a previous cooling operation for the freezing zone 33 where a temperature equal to or lower than the ice point needs to be reached. The refrigerant evaporates in the cold storage evaporator 47 at a temperature lower than in the cold storage evaporator 43. When the refrigerant flows into both zones under the condition where the interior of the refrigerator is not sufficiently cooled, an amount of refrigerant flowing into the evaporator 47 is smaller than into the evaporator 43. Accordingly, the refrigerant evaporates quickly in the evaporator 47 into an overheat gas. On the other hand, a larger amount of refrigerant flows into the cold storage zone evaporator 43. When an overall amount of refrigerant do not evaporate by the heat exchange in the evaporator 47, part of the refrigerant would possibly return to the compressor 51 in the liquid state. When the atmosphere in the freezing zone 32 and the evaporator 47 are previously cooled before the simultaneous cooling for the cold storage and freezing zones 32 and 33, the refrigerant remains in the evaporator 47 upon start of the simultaneous cooling, the refrigerant can be prevented from concentration into the cold storage zone evaporator 43. Consequently, the refrigerant having entered the evaporator 43 tends to completely evaporate. Furthermore, the previous cooling for the freezing zone 33 reduces a time required for cooling the atmospheres in both zones to the respective temperatures at which the refrigerator is switched to the normal operation mode.

The control device 59 determines, at step S14, whether the temperature in either zone 32 or 33 is equal to or lower than the respective predetermined temperature, as described above. However, the control device 59 may determine whether the temperatures in both zones 32 and 33 are equal to or lower than the predetermined temperatures respectively, instead.

Figure 9:
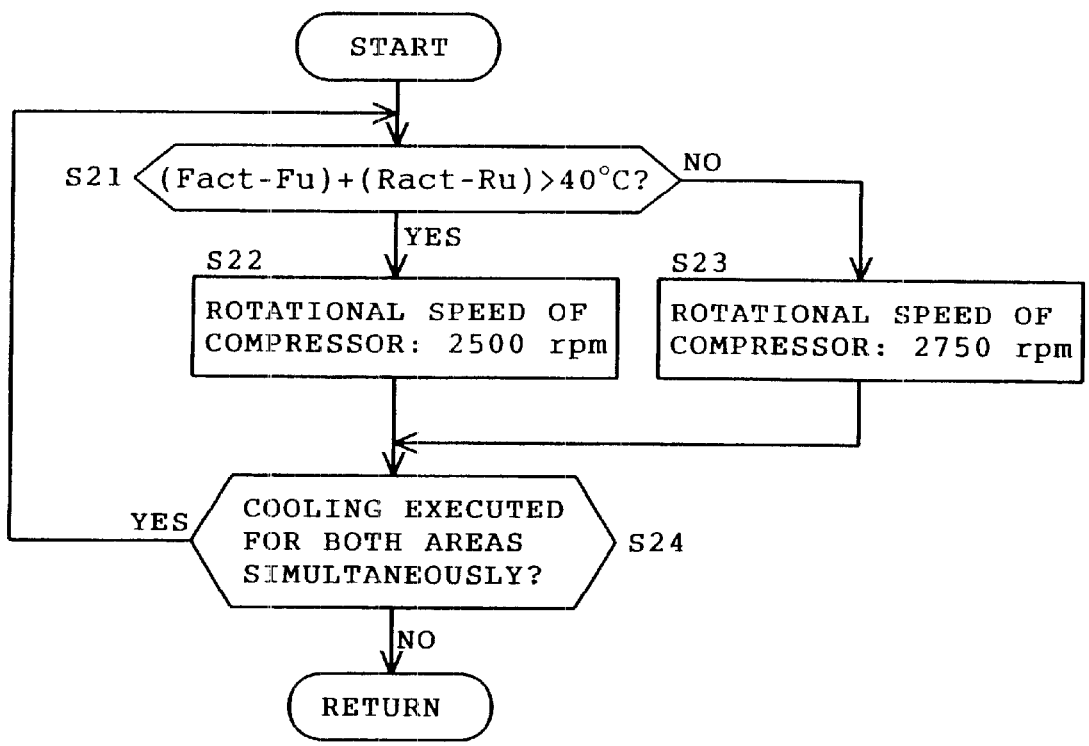
FIG. 9 is a view similar to FIG. 1, showing the refrigerator of a third embodiment in accordance with the invention.

FIG. 9 shows a third embodiment of the invention. The third embodiment differs from the first and second embodiments in a manner of driving the compressor 51 during flow of refrigerant into both passages X and Y. The period when the refrigerant is flowing into both passages X and Y refers to a period from start of step S1 to start of step S4 in FIG. 1. The period further refers to a period from start of step S13 to start of step S16 in FIG. 8.

Referring to FIG. 9, the control of the compressor 51 in the foregoing period will now be described. FIG. 9 shows only the control of the compressor 51 in the period when the refrigerant is caused to flow simultaneously into both passages. The other equipment operates according to the sequence flows of FIGS. 1 and 8. The control device 59 executes step S21 upon start of a control sequence for causing the refrigerant to flow simultaneously into the first and second passages X and Y. At step S21, the control device 59 operates the freezing zone temperature sensor 60 to measure an actual temperature Fact in the freezing zone 33 and further operates the cold storage zone temperature sensor 61 to measure an actual temperature Ract in the cold storage zone 32. The control device 59 obtains the difference between the measured temperature Fact and a target temperature Fu for the freezing zone 33 and the difference between the measured temperature Ract and a target temperature Ru for the cold storage zone 32 by calculation. The control device 59 then determines whether the sum of the two differences is larger than a predetermined temperature (for example, 40° C.).

When the sum is larger than the predetermined temperature, the control device 59 advances to step S22 to start the compressor 51 at a low speed (for example, 50 rpm). On the other hand, when the sum is equal to or smaller than the predetermined temperature, the control device 59 advances to step S23 to start the compressor 51 at a high speed (for example, 75 rpm). The control device 59 advances to step S24 after execution of either step S22 or S23. At step S24, the control device 59 determines whether the simultaneous cooling is under execution. When determining that the simultaneous cooling is under execution, the control device 59 returns to step S21. When the simultaneous cooling is not under execution, the control device 59 finishes this control sequence. Thereafter, the control device operates in accordance with the control sequences of FIGS. 1 and 8.

In the third embodiment, the compressor 51 is driven with its low compressing performance when the differences between the actual temperatures and the target temperatures in the cold storage and freezing zones respectively are large. The compressor 51 is driven with its low compressing performance when the differences are large, whereas the compressor is driven with its high compressing performance when the differences are small. Thus, the compressing performance of the compressor 51 is reduced when the temperature is high in the refrigerator. Describing the reason for this control manner, the refrigerant evaporated in the evaporators absorbs a sufficient amount of heat in the refrigerator by heat exchange when the temperature is high in the refrigerator, so that the refrigerant returns to the compressor 51 in the phase of a high temperature high pressure gas. When driven at a high speed for compression in this case, the compressor 51 is sometimes overloaded since an amount of refrigerant circulated is large. Further, the temperature of the compressed refrigerant becomes excessively high such that the temperature of the condenser 52 is abnormally increased. In the embodiment, however, the compressor 51 is driven at a low speed so that the compressing performance thereof is reduced. Consequently, the foregoing drawbacks can be overcome.

When the temperature in the refrigerator is high, the rotational speed of the compressor 51 is reduced so that the compressor can be prevented from the overloaded condition, as described above. The rotational speed of the heat-dissipating fan 58 may be adjusted for the same purpose, instead. More specifically, the fan 58 is driven at a high speed when the temperature is high in the refrigerator, whereas the rotational speed of the fan 58 is reduced when the temperature has dropped in the refrigerator.

Thus, when the fan 58 is driven at a high speed under the condition where the temperature is high in the refrigerator, the refrigerant is sufficiently cooled by the condenser 52 to be supplied into the evaporators 43 and 47. Accordingly, the temperature of the refrigerant gas evaporated in each of the evaporators 43 and 47 is not increased much and the pressure of the refrigerant is not also increased much. Consequently, the compressor 51 can be prevented from being overloaded even when high-speed operation of the compressor is continued.

Furthermore, when the temperature is high in the refrigerator, the compressor 51 may be driven at a low speed and the heat-dissipating fan 58 may be driven at a high speed. When the temperature has dropped in the refrigerator, the compressor 51 may be driven at a high speed and the fan 58 may be driven at a normal speed. The same effect as described above can be achieved.

Figure 10:
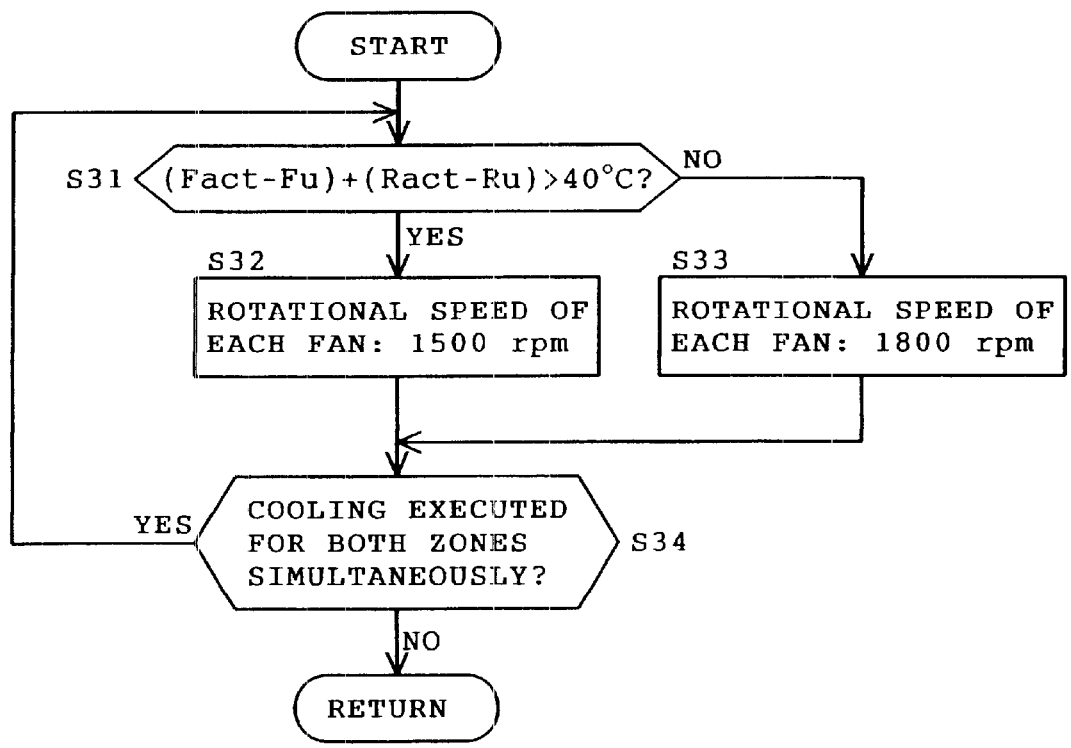
FIG. 10 is a view similar to FIG. 1, showing the refrigerator of a fourth embodiment in accordance with the invention.

FIG. 10 illustrates a fourth embodiment of the invention. The fourth embodiment differs from the first and second embodiments in an amount of heat exchanged in each of the evaporators 43 and 47 during the period in which the refrigerant is caused to flow simultaneously into both passages X and Y. The other mechanical construction and electrical arrangement of the refrigerator in the fourth embodiment are the same as those in the first and second embodiments. Only the difference will be described.

In the first embodiment, the refrigerant is caused to flow simultaneously into both passages X and Y in a period from start of step S1 to start of step S4 in FIG. 1. In the second embodiment, the refrigerant is caused to flow simultaneously into both passages X and Y in a period from start of step S13 to start of step S16 in FIG. 8.

The cold storage and freezing zone fans 44 and 48 will be driven in the aforesaid period in the following manner with reference to FIG. 10. FIG. 10 shows only the control of the fans 44 and 48 in the period when the refrigerant is caused to flow simultaneously into both passages. The other equipment operates according to the sequence flows of FIGS. 1 and 8.

The control device 59 executes step S31 upon start of a control sequence for causing the refrigerant to flow simultaneously into the first and second passages X and Y. At step S31, the control device 59 operates the freezing zone temperature sensor 60 to measure an actual temperature Fact in the freezing zone 33 and further operates the cold storage zone temperature sensor 61 to measure an actual temperature Ract in the cold storage zone 32. The control device 59 obtains the difference between the measured temperature Fact and a target temperature Fu for the freezing zone 33 and the difference between the measured temperature Ract and a target temperature Ru for the cold storage zone 32 by calculation. The control device 59 then determines whether the sum of the two differences is larger than a predetermined temperature (for example, 40° C.).

When the sum is larger than the predetermined temperature, the control device 59 advances to step S32 to start both fans 44 and 48 at a low speed (for example, 1500 rpm). On the other hand, when the sum is equal to or smaller than the predetermined temperature, the control device 59 advances to step S33 to start both fans 44 and 48 at a high speed (for example, 1800 rpm). The control device 59 advances to step S34 after execution of either step S32 or S33. At step S34, the control device 59 determines whether the simultaneous cooling is under execution. When determining that the simultaneous cooling is under execution, the control device 59 returns to step S31. When the simultaneous cooling is not under execution, the control device 59 finishes this control sequence. Thereafter, the control device operates in accordance with the control sequences of FIGS. 1 and 8.

In the fourth embodiment, in the period when the difference between the actual and target temperatures is large, each of the fans 44 and 48 is driven at the low speed so that an amount of heat exchanged in each of the evaporators 43 and 47 is reduced. On the other hand, in the period when the difference is small, each fan is driven at the high speed so that an amount of exchanged heat is increased. Describing the reason for this control manner, the refrigerant evaporated by the evaporators 43 and 47 absorbs a sufficient amount of heat in the refrigerator by heat exchange, returning to the compressor 51. In this case, when an amount of heat exchanged in each evaporator is excessively large, the refrigerant absorbs an excessive amount of heat, returning to the compressor 51 in the phase of a high temperature high pressure gas. When driven at a high speed for compression in this case, the compressor 51 is sometimes overloaded since an amount of refrigerant circulated is large. Further, the temperature of the compressed refrigerant becomes excessively high such that the temperature of the condenser 52 is abnormally increased. In the embodiment, however, the fans 44 and 48 are driven at respective low speeds so that the refrigerant is prevented from becoming a high temperature high pressure gas. Consequently, the foregoing drawbacks can be overcome.

The foregoing driving manner may be combined with the driving manner of reducing the speed of the compressor 51 as described in the third embodiment, the driving manner of reducing the speed of the heat-dissipating fan 58, or both manners. The same effect as described above can be achieved in each of these cases.

Figure 11:
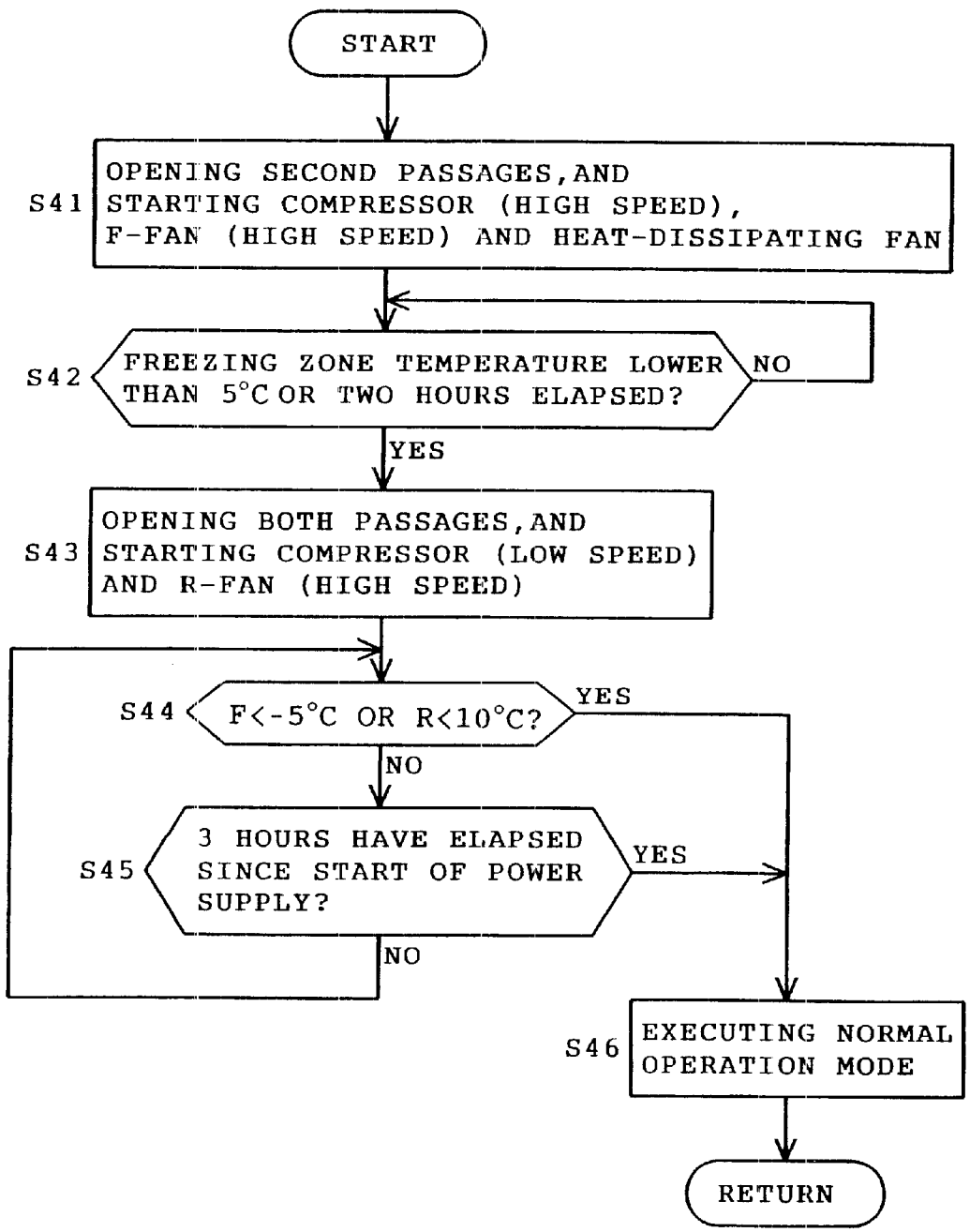
FIG. 11 is a view similar to FIG. 1, showing the refrigerator of a fifth embodiment in accordance with the invention.

FIG. 11 illustrates a fifth embodiment of the invention. The fifth embodiment is similar to the second embodiment with difference in the driving manner of the compressor 51. The refrigerator of the fifth embodiment has the same mechanical construction and electrical arrangement as those in the second embodiment except for the control sequence of FIG. 11. Only the difference between the control sequences of FIGS. 8 and 11 will be described.

In the second embodiment, the compressor 51 is started at step S11 in FIG. 8 and then driven at a predetermined speed until the control device 59 starts the normal operating mode at step S16. On the other hand, in the fifth embodiment, when power is supplied to the refrigerator and thereafter, the control device 59 operates to cause the refrigerant to flow only into the second passage Y, the compressor 51 is started at a high speed (for example, 2750 rpm) at step S41. The control device 59 then advances to step S43 to switch the compressor 51 to a low speed (for example, 2500 rpm) when operating to cause the refrigerant to flow simultaneously into both passages X and Y. Thereafter, the low speed is maintained until the normal operation mode is started at step S46.

In the fifth embodiment, the compressor 51 is driven at a high speed for previous cooling until only the temperature in the freezing zone becomes smaller than a predetermined temperature or a predetermined time elapses. The simultaneous cooling is then carried out for both cold storage and freezing zones until the temperatures in both zones 32 and 33 reach the respective predetermined temperatures or a predetermined time elapses. Thereafter, the refrigerator is switched to the normal operation mode. During the simultaneous cooling, the compressor 51 is driven at a low speed so that the compressing performance is maintained at the low level.

According to the fifth embodiment, cooling is carried out for the freezing zone 32 and the evaporator 47 before the simultaneous cooling for both zones 32 and 33. Thus, since the refrigerant remains in the freezing zone evaporator 47 upon start of the simultaneous cooling for both zones 32 and 33, the refrigerant can be prevented from concentration on the evaporator 43. Further, since the compressor 51 is driven with the reduced compressing performance during the simultaneous cooling for both zones 32 and 33, the compressor can be prevented from being overloaded, and the condenser 52 can be prevented from overheat due to an excessive increase in the temperature of the compressed refrigerant.

In the fifth embodiment, the rotational speed of the compressor 1 is reduced during the period when the refrigerant is caused to flow simultaneously into both passages, so that occurrence of a bad condition is prevented. However, the heat-dissipating fan 58 may be driven at a high speed without changing the rotational speed of the compressor 51, instead. When the rotational speed of the fan 58 is increased, overheat of the condenser 52 can be prevented. Further, both temperature and pressure of the refrigerant returned to the compressor 51 are reduced such that load applied to the compressor 51 is reduced.

The foregoing reduction in the speed of the compressor 51 and increase in the speed of the fan 58 may be carried out simultaneously. Additionally, at step S44 in FIG. 11, the control device 59 determines whether either one of the temperatures in the respective zones 32 and 33 is lower than the predetermined temperature. However, the control device 59 may determine whether both temperatures in the zones 32 and 33 are lower than the respective predetermined temperatures, instead.

Figure 12:
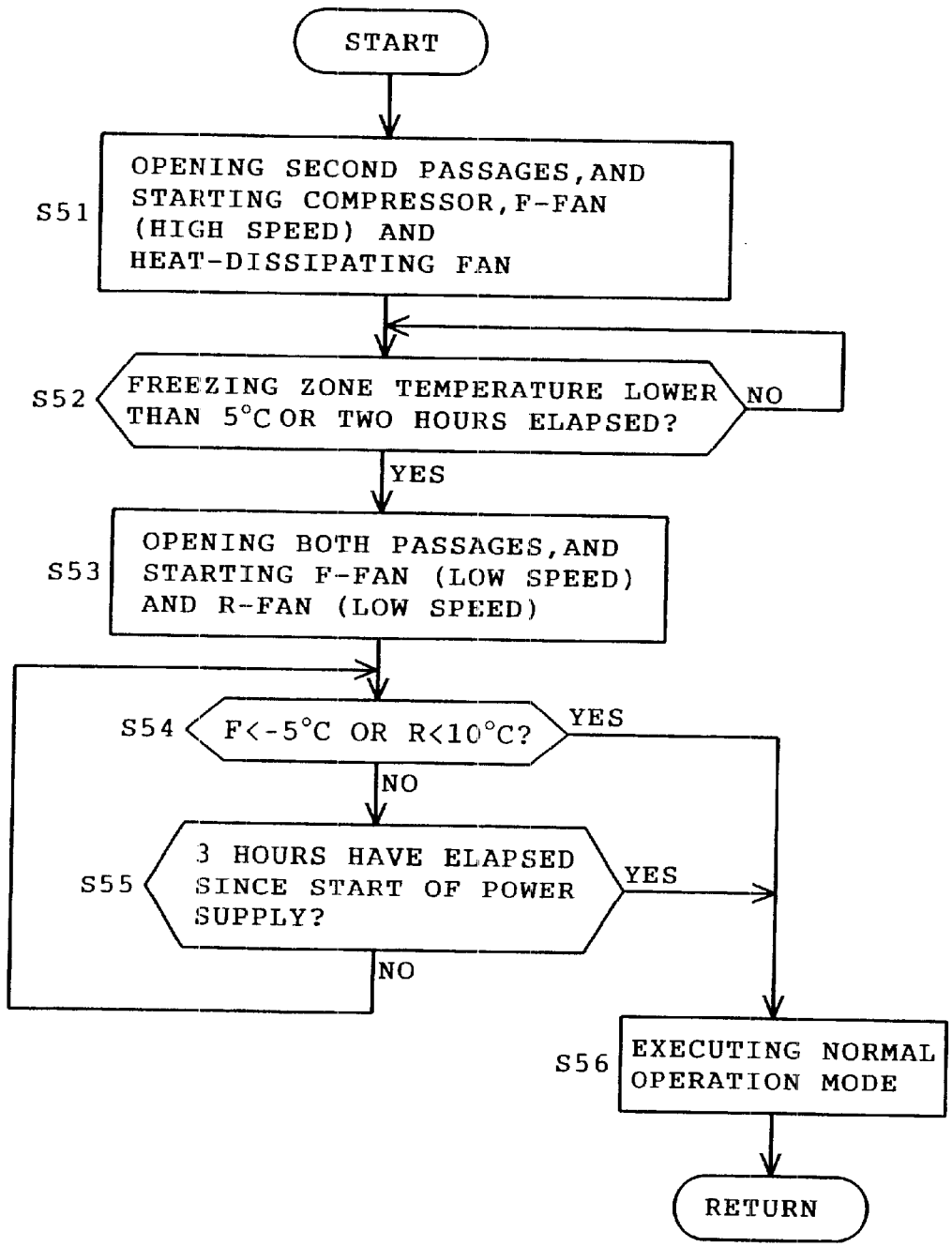
FIG. 12 is a view similar to FIG. 1, showing the refrigerator of a sixth embodiment in accordance with the invention.

FIG. 12 illustrates a sixth embodiment of the invention. The sixth embodiment is similar to the second embodiment with difference in the driving manners of the cold storage and freezing zone fans 44 and 48. The refrigerator of the sixth embodiment has the same mechanical construction and electrical arrangement as those in the second embodiment except the control sequence of FIG. 12. Only the difference between the control sequences of FIGS. 8 and 12 will be described.

In the second embodiment, the freezing zone fan 48 is started at the high speed at step S11 in FIG. 8, and the high speed drive is continued until the normal operation mode is started at step S16. On the other hand, the fan 48 is started at a high speed (for example, 2000 rpm) at step S51 after power supply in the sixth embodiment and switched to a low speed (for example, 1500 rpm) at step S53 in which the refrigerant is caused to flow simultaneously into both passages X and Y. Further, in the second embodiment, the cold storage zone fan 44 is started at the high speed (for example, 2000 rpm) at step S13 in which the refrigerant is caused to flow simultaneously into both passages X and Y. In the sixth embodiment, however, the fan 44 is started at a low speed (for example, 1500 rpm) at step S53. The foregoing rotational speeds of both fans 48 and 44 are maintained until step S56 where the normal operation mode is started.

In the sixth embodiment, the refrigerant is caused to flow only into the second passage Y so that the freezing zone 33 is cooled. This cooling manner is continued until the temperature in the freezing zone 33 becomes less than a predetermined temperature or a predetermined time elapses. The simultaneous cooling is then carried out for both cold storage and freezing zones until the temperatures in both zones 32 and 33 reach the respective predetermined temperatures or a predetermined time elapses. Thereafter, the refrigerator is switched to the normal operation mode. Both fans 44 and 48 are driven at respective low speeds during the simultaneous cooling. Since amounts of heat exchanged in the respective evaporators 43 and 47 are small, the refrigerant evaporated in both evaporators returns to the compressor 51 in the phase of a low-temperature low-pressure gas. Consequently, since load applied to the compressor 51 is reduced, the compressor can be prevented from being overloaded and the condenser 52 can be prevented from overheat due to an excessive increase in the temperature of the compressed refrigerant.

In the sixth embodiment, during a period when the refrigerant is caused to flow simultaneously into both passages, the compressor 51 may be driven at a low speed or the heat-dissipating fan 58 may be driven at a high speed. Further, the compressor 51 and the fan 58 may simultaneously be driven at the low and high speeds respectively.

Additionally, at step S54 in FIG. 12, the control device 59 determines whether either one of the temperatures in the respective zones 32 and 33 is lower than the predetermined temperature. However, the control device 59 may determine whether both temperatures in the zones 32 and 33 are lower than the respective predetermined temperatures, instead.

Figure 13:
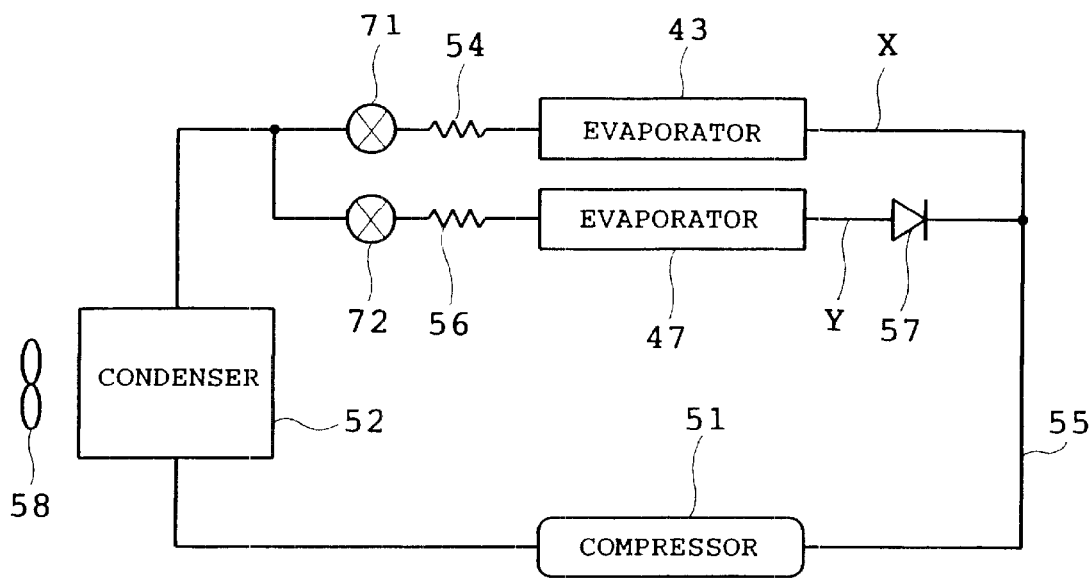
FIG. 13 is a view similar to FIG. 3, showing the refrigerator of a seventh embodiment in accordance with the invention.
Figure 14:
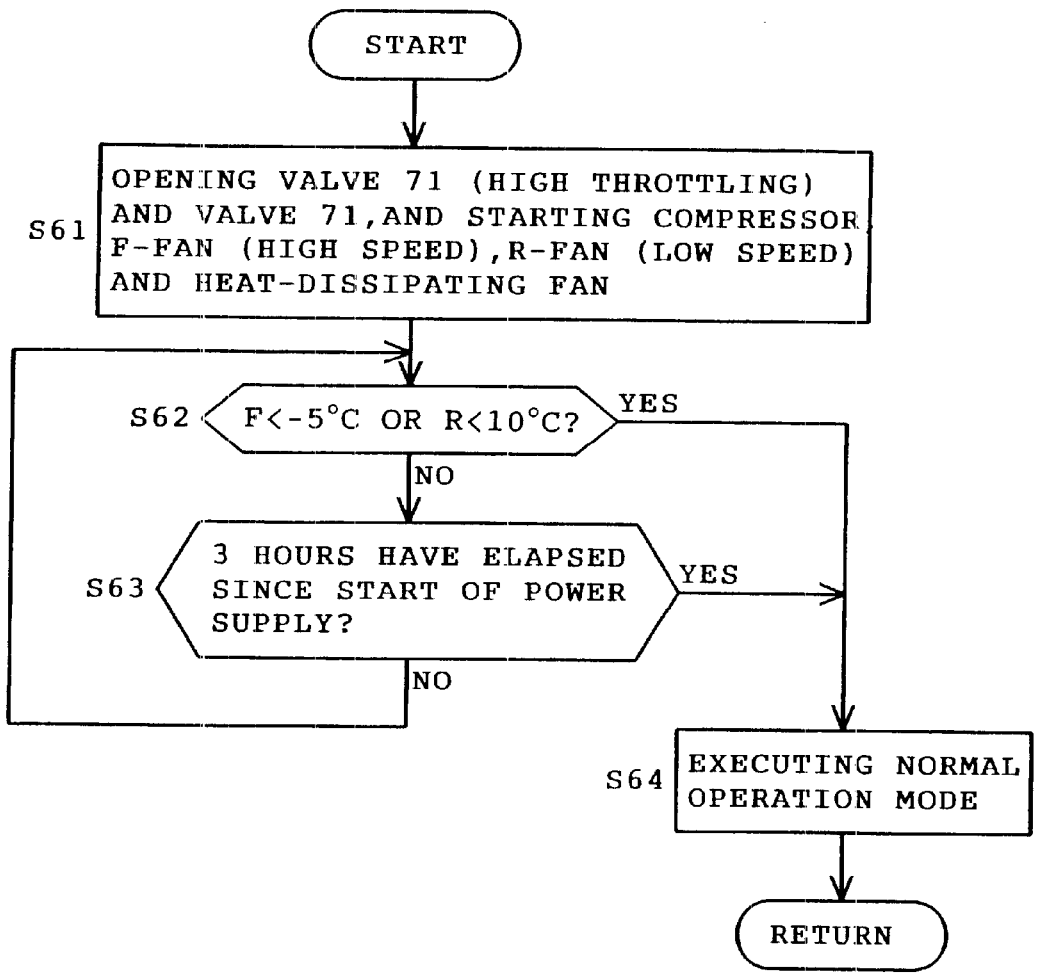
FIG. 14 is a view similar to FIG. 1, showing the refrigerator of the seventh embodiment.

FIGS. 13 and 14 illustrate a seventh embodiment of the invention. The valve 53 constituting the refrigerating cycle in the first embodiment is replaced by two valves 71 and 72 in the seventh embodiment. The valve 71 is disposed between the condenser 52 and the cold storage zone capillary tube 54. The valve 71 is an expansion valve and controls flow, flow rate and expansion of the refrigerant into the capillary tube 54. An opening of the valve 71 is varied by an actuator for control of the flow rate. The valve 72 is disposed between the condenser 52 and the freezing zone capillary tube 56 and controls flow of the refrigerant into the capillary tube.

FIG. 14 shows a cooling sequence executed by the refrigerator. Upon power supply to the refrigerator, the control device 59 executes step S61. At step S61, the control device 59 opens both valves 71 and 72 so that the refrigerant flows through both of the first and second passages X and Y as shown in FIG. 5. In this case, the throttling of the valve 71 is higher than the throttling of the valve 72 or the opening of the valve 71 is smaller than the opening of the valve 72. In other words, the mass flow of the refrigerant flowing through the valve 71 is smaller than the mass flow of the refrigerant flowing through the valve 72. Concurrently, the control device 59 then starts the compressor 51 and the heat-dissipating fan 58. The control device 59 further starts the cold storage zone fan or R-fan 44 at a high speed (for example, 2000 rpm) and the freezing zone fan or F-fan 48 at a low speed (for example, 1500 rpm).

The control device 59 then executes step S62. At step S62, the control device 59 determines whether the temperature (F) in the freezing zone 33 is lower than a predetermined temperature (for example, −5° C.) or whether the temperature (R) in the cold storage zone 32 is lower than a predetermined temperature (for example, 10° C.). When neither condition is met, the control device 59 advances to step S63, where the control device 59 determines whether a predetermined time (for example, 3 hours) has elapsed from the start of operation (or power supply). When the determination is negative, the control device 59 returns to step S62 to repeat the determination. The control device 59 advances to step S64 when the determination is affirmative at either step S62 or S63. At step S64, the control device 59 stops causing the refrigerant to flow simultaneously into both passages X and Y, starting the normal operation mode. In the normal operation mode, both fans 44 and 48 are driven at rotational speeds corresponding to the set temperatures of the cold storage and freezing zones 32 and 33 respectively. Further, the rotational speed of the compressor 51 is controlled so that the temperatures in the zones 32 and 33 become equal to the set temperatures respectively. Additionally, the opening of the valve 71 or the mass flow of the refrigerant is set so as to correspond to the set temperature for the cold storage zone 33. The opening of the valve 71 is usually lower than at step S61. Thus, the seventh embodiment differs from the first embodiment in that the valve 71 and the capillary tube 54 through both of which the refrigerant flows into the passage X are throttled during the period when the refrigerant is caused to flow simultaneously into the first and second passages X and Y after power supply.

The temperature in the freezing zone 33 is required to be kept lower than the temperature in the cold storage zone 32 in the normal operation mode. Accordingly, the opening of the cold storage zone capillary tube 54 is higher than that of the freezing zone capillary tube 56. When both valves 71 and 72 are full opened, an amount of refrigerant flowing into the cold storage zone evaporator 43 is larger than an amount of refrigerant flowing into the freezing zone evaporator 47. As a result, cooling for the freezing zone 32 is retarded relative to cooling for the cold storage zone 33. Further, the liquid refrigerant is not evaporated completely in the evaporator 43, so that part of the refrigerant may return to the compressor 51 in its liquid phase. In the embodiment, however, the opening of the valve 71 is reduced during the period when the refrigerant is caused to flow simultaneously into both passages X and Y, so that an amount of refrigerant flowing into the cold storage zone evaporator 43 is reduced. Consequently, the atmospheres in both zones 32 and 33 are cooled so that the set temperatures are reached in both zones in about the same period, and the refrigerant can be prevented from returning to the compressor 51 in the liquid phase.

In the embodiment, the valve 71 and the capillary tube 54 through both of which the refrigerant flows into the passage X are throttled, as described above. However, only the opening of the valve 71 may be adjusted without use of the capillary tube 54. The refrigerating cycle employed in the second embodiment as shown in FIG. 3 may be substituted by that of the seventh embodiment as shown in FIG. 13. Further, at step S62, the control device 59 determines whether the temperature either in the cold storage or freezing are 32 or 33 is lower than the predetermined temperature. However, the control device 59 may determine whether the temperatures both in the zones 32 and 33 are lower than the predetermined ones respectively, instead.

Figure 15:
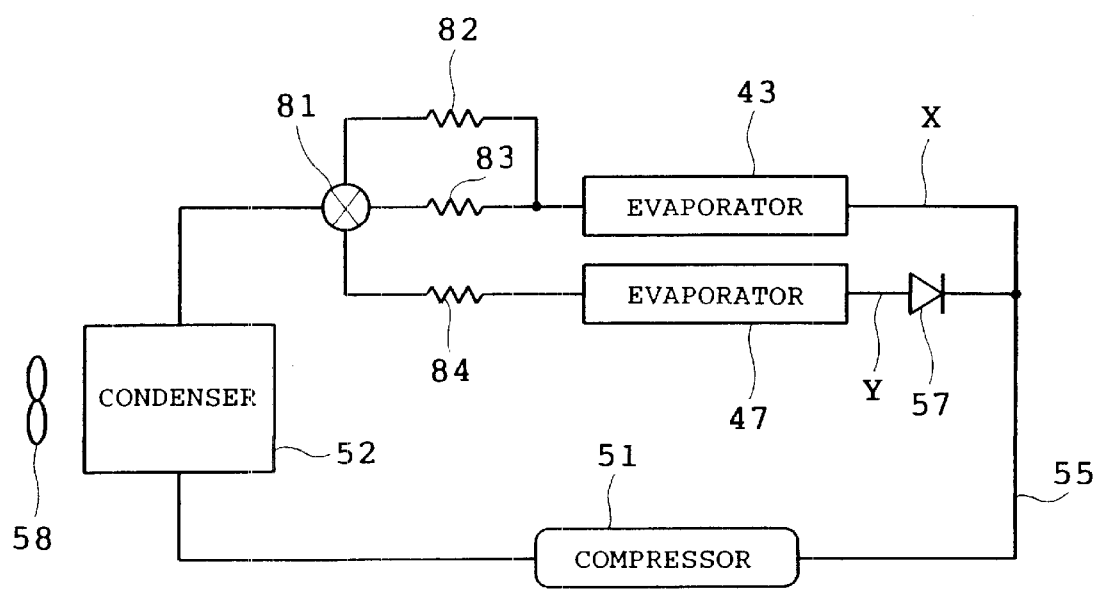
FIG. 15 is a view similar to FIG. 3, showing the refrigerator of an eighth embodiment in accordance with the invention.

FIG. 15 illustrates an eighth embodiment of the invention. In the eighth embodiment, the refrigerant flowing out of the evaporator 52 is led into a valve 81 which is a four-way valve having one entrance and three exits. A first cold storage zone capillary tube 82 is provided between the first exit of the valve 81 and the cold storage zone evaporator 43. A second cold storage zone capillary tube 83 is provided between the second exit of the valve 81 and the evaporator 43. A third freezing zone capillary tube 84 is provided between the third exit of the valve 81 and the freezing zone evaporator 47. The valve 81 through which the refrigerant from the condenser 52 flows is switched among a first state where only the third exit is open, a second state where only the second exit is open, and a third state where both first and third exits are open. The first cold storage zone capillary tube 82 has substantially the same throttling or opening as the freezing zone capillary tube 84, and the second cold storage capillary tube 83 has a larger opening or lower throttling than the capillary tube 82.

The cooling sequence in the eighth embodiment has a slight difference from that shown as the seventh embodiment in FIG. 14. Accordingly, only the differences between FIGS. 14 and 15 will be described. In FIG. 14, both valves 71 and 72 are opened so that the refrigerant is caused to flow simultaneously into the evaporators 43 and 47 respectively, at step S61. In the embodiment, however, the valve 81 is switched so that the refrigerant is caused to flow into both capillary tubes 82 and 84. As a result, the atmospheres in both zones 32 and 33 are cooled simultaneously. In this case, since the opening of the capillary tube 82 or an amount of refrigerant flowing through the capillary tube 82 is smaller, the same effect can be achieved from the eighth embodiment as that in the seventh embodiment where the opening of the expansion valve 71 is decreased for the refrigerant flowing into the capillary tube 54.

Another difference relates to a manner of selecting a refrigerant passage the under the normal operation mode at step S64 in FIG. 14. In the seventh embodiment, the valve 71 is opened and the valve 72 is closed when the cold storage zone 32 is cooled. On the other hand, the valve 71 is closed and the valve 72 is opened when the freezing zone 33 is cooled. In the eighth embodiment, when the atmosphere in the cold storage zone 32 is cooled, the valve 81 is switched so that the refrigerant flows only into the capillary tube 83. When the atmosphere in the freezing zone 33 is cooled, the valve 81 is switched so that the refrigerant flows only into the capillary tube 84. The above-described switching manner can achieve the same effect as in the seventh embodiment.

Figure 16:
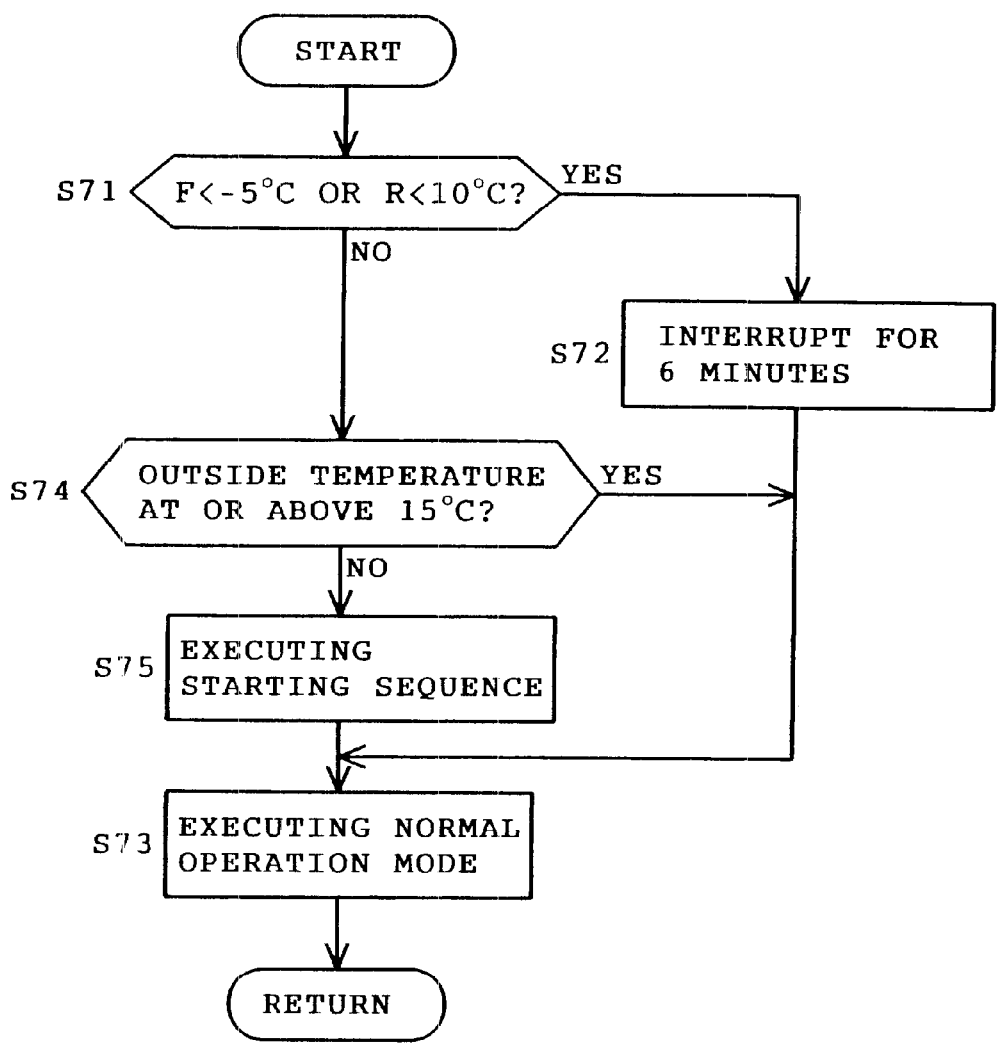
FIG. 16 is a flowchart showing a starting manner in the refrigerator of a ninth embodiment in a case where it is cold in the interior of the refrigerator upon power supply or when the outside temperature is low.

FIG. 16 illustrates a ninth embodiment of the invention. The ninth embodiment relates to a starting manner in a case where it is cold in the interior of the refrigerator upon power supply or when the outside temperature is low. Referring to FIG. 16, step S71 is carried out upon power supply. At step S71, the control device 59 determines either whether the temperature (F) in the freezing zone 33 is lower than a predetermined temperature (for example, −5° C.) or whether the temperature (R) in the cold storage zone 32 is lower than a predetermined temperature (for, example, 10° C.). When either one of the conditions is met, the control device 59 advances to step S72, where the control device 59 does not start the refrigerating cycle but is on standby for a predetermined period (for example, 6 minutes) without starting the compressor 51. The control device 59 then advances to step S73 after elapse of a predetermined period to immediately start the normal operation mode.

When neither condition is met at step S71, the control device 59 advances to step S74, where the outside temperature is detected by the outside temperature sensor 72 and the control device 59 determines whether the detected outside temperature is lower than a predetermined temperature (for example, 15° C.). When the outside temperature is lower than the predetermined temperature, the control device 59 advances to step S73 to start the normal operation mode immediately. When the outside temperature is equal to or higher than the predetermined temperature, the control device 59 advances to step S75 where the starting sequence is executed. The starting sequence refers to a sequence from the time immediately after power supply to the start of the normal operation mode in each of the embodiments 1 to 8. For example, in the first embodiment, the sequence from step S1 to the time immediately before step S4. Upon completion of the starting sequence, the control device 59 advances to step S73 to start the normal operation mode.

The difference between the actual temperature and the set temperature of each zone 32 or 33 is small when the temperature in the refrigerator is low upon time of power supply. Accordingly, there is no problem even if the refrigerator is immediately switched to the normal operation mode. However, the aforesaid low temperature condition often results from a fact that the power had been cut off and was re-supplied. In this case, high pressure gas often remains in the output side of the compressor 51. Accordingly, when immediately started, the compressor 51 is overloaded such that an overcurrent flows into the compressor. The control device 59 is on standby for the predetermined period at step S72 so that the compressor 51 is started after the pressure at the output side thereof has been reduced. Consequently, the compressor 51 can be prevented from overload.

Further, when the outside temperature is high, load applied to the refrigerating cycle is large. Accordingly, the starting sequence needs to be carried out. On the other hand, when the outside temperature is lower, load applied to the refrigerating cycle is small, so that the starting sequence is not carried out and the normal operation mode is immediately carried out. Additionally, the control device 59 determines whether the temperature in either the cold storage or freezing zone 32 or 33 is lower than the respective set temperature. However, the control device 59 may determine whether the temperatures in both zones are lower than the respective set temperatures, instead.

Figure 17:
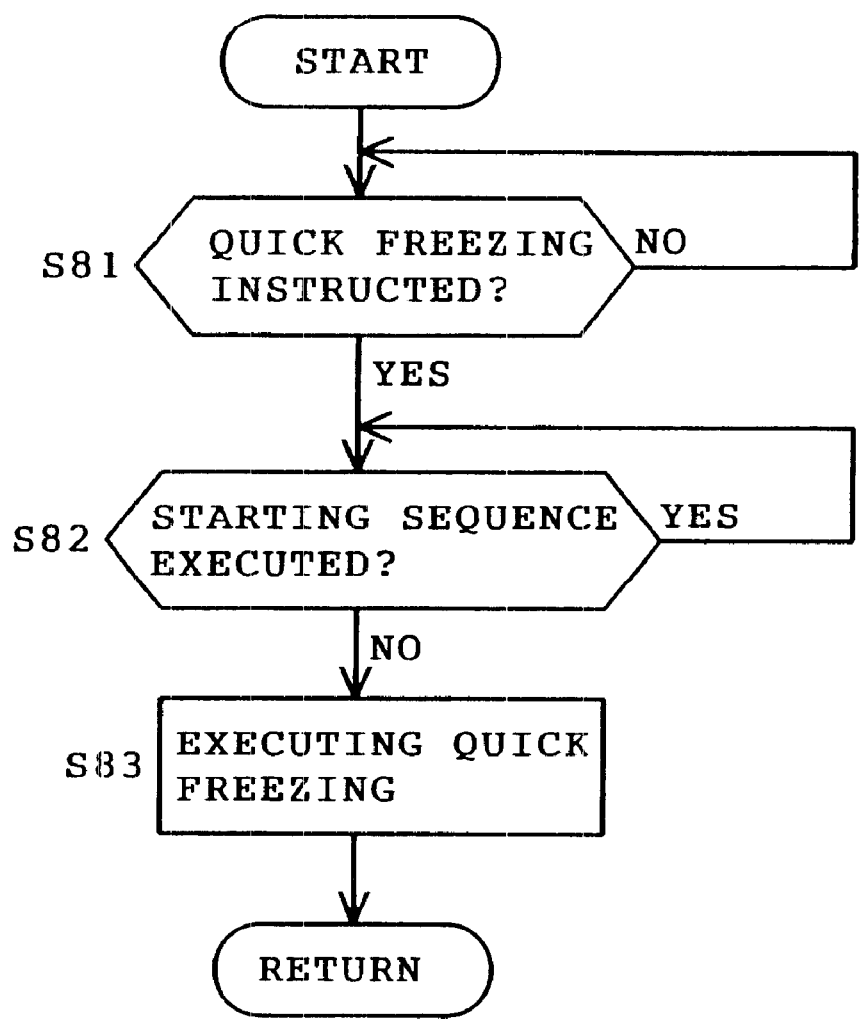
FIG. 17 is a flowchart showing a control sequence for the quick freezing in the refrigerator of a tenth embodiment.
Figure 18:
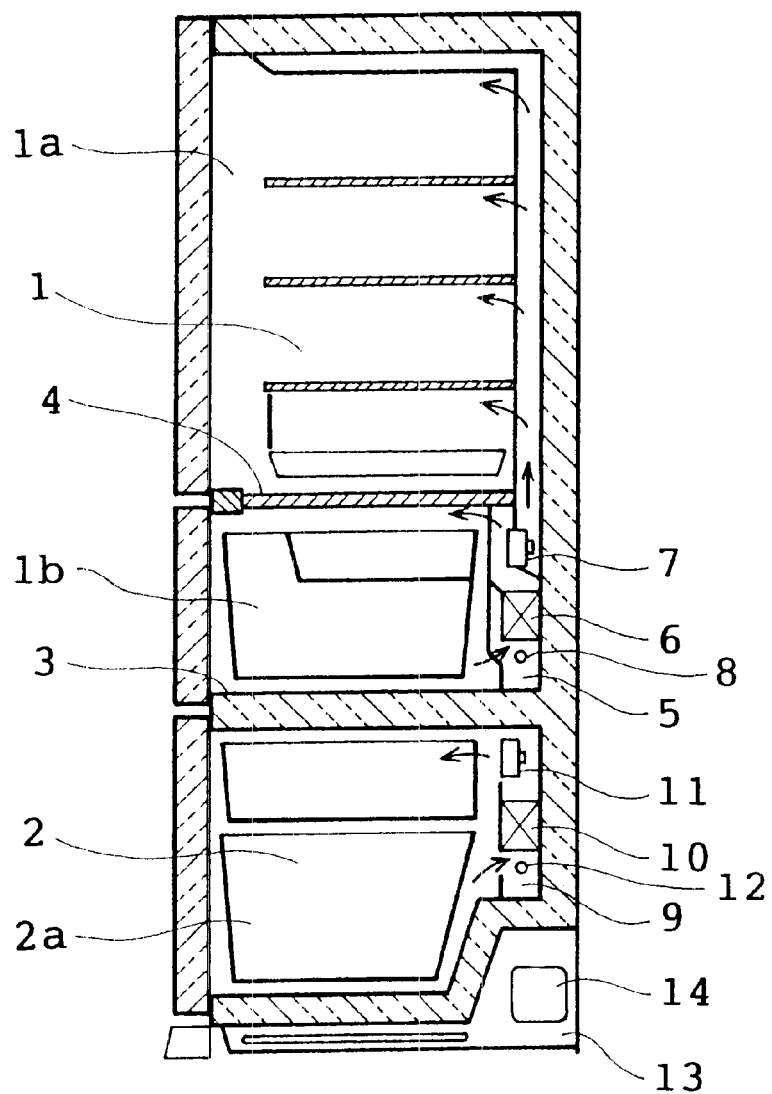
FIG. 18 is a view similar to FIG. 2, showing a prior art refrigerator.
Figure 19:
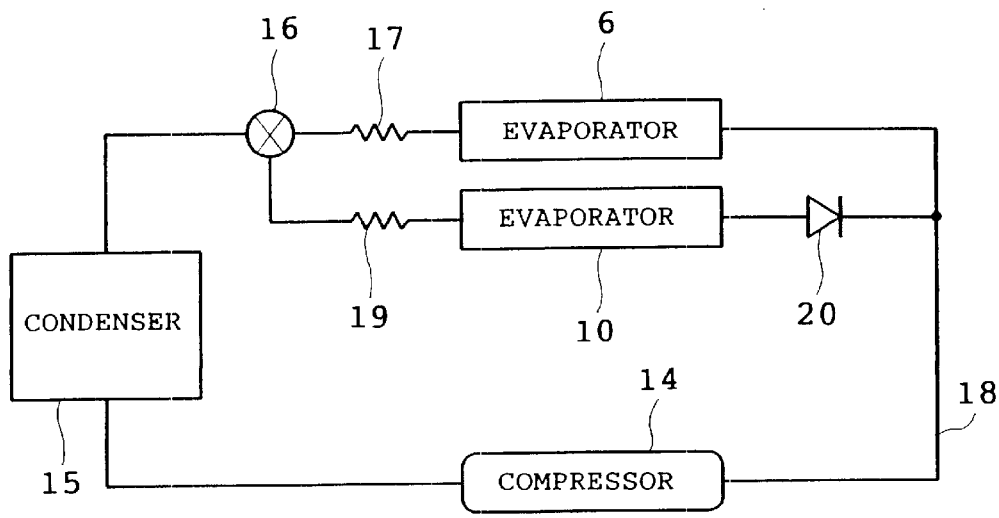
FIG. 19 is a view similar to FIG. 3, showing the prior art refrigerator.
Figure 20:
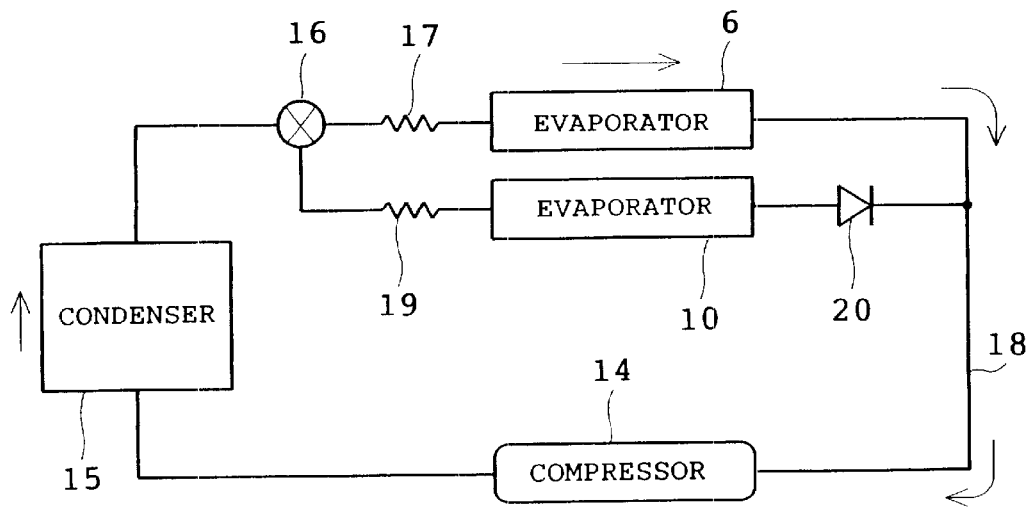
FIG. 20 is a view similar to FIG. 5, showing the prior art refrigerator.
Figure 21:
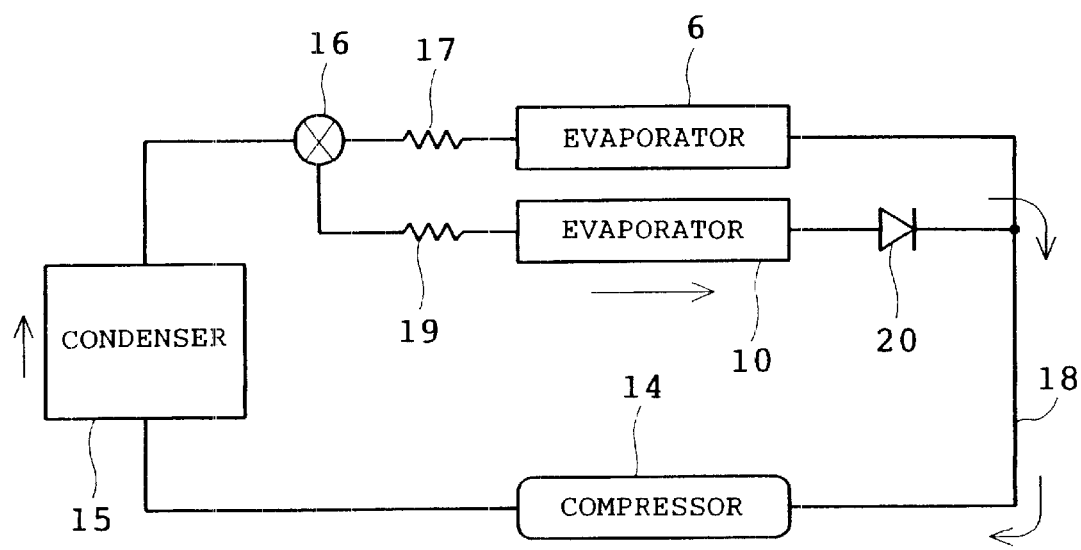
FIG. 21 is a view similar to FIG. 6, showing the prior art refrigerator.

FIG. 17 illustrates a tenth embodiment of the invention. Refrigerators normally have a quick freezing function. The tenth embodiment is directed to the quick freezing function. It is not sufficiently cool in the interior of the refrigerator immediately after power has been supplied to the refrigerator. Accordingly, the quick freezing should not be carried out. Accordingly, in the tenth embodiment, the control for the quick freezing is not carried out during the starting sequence in each of the foregoing embodiments and is carried out after completion of the starting sequence.

Referring to FIG. 17 showing a control sequence for the quick freezing, the control device 59 advances to step S81 upon power supply. At step S81, the control device 59 determines whether instructions for the quick freezing have been received. The setting operation section 63 as shown in FIG. 4 delivers the instructions for the quick freezing to the control device 59. When receiving no instructions, the control device 59 returns to step S81 to be on standby for the instructions. Upon receipt of the instructions for the quick freezing, the control device 59 advances to step S82, where the control device 59 determines whether the starting sequence is now being executed. The starting sequence refers to that described in the ninth embodiment. When determining that the starting sequence is now being executed, the control device 59 re-carries out step S82. When the starting sequence is not under execution, the control device 59 advances to step S83 to execute the quick freezing. Thus, the quick freezing is executed upon completion of the starting sequence.

Instructions for ice making or defrosting may be issued instead of the above-described instructions for the quick freezing. In the case of these instructions, too, the instructions should be refrained during execution of the starting sequence and may be executed after the starting sequence has been carried out. As the result of execution of the foregoing sequence, a period required for cooling the interior of the refrigerator to a predetermined temperature after power supply can be prevented from being retarded.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A refrigerator provided with a cold storage zone and a freezing zone both defined therein, comprising:
    a compressor for compressing a refrigerant;
    a condenser provided with a heat-dissipating fan;
    a first passage including a cold storage zone capillary tube and a cold storage zone evaporator, the latter two being connected in series to each other;
    a second passage including a freezing zone capillary tube and a freezing zone evaporator, the latter two being connected in series to each other;
    a switching valve causing the refrigerant condensed by the condenser to flow selectively through any one of the first passage, the second passage and both the first and second passages;
    a variable speed, cold storage zone fan circulating air in the cold storage zone while the air is in contact with the cold storage zone evaporator;
    a variable speed, freezing zone fan circulating air in the freezing zone while the air is in contact with the freezing zone evaporator; and
    control means switching the switching valve upon power supply to the refrigerator so that the refrigerant flows through both the first and second passages, starting the compressor, starting the cold storage zone fan so that said fan is driven at a high speed, starting the freezing zone fan so that said fan is driven at a lower speed than the cold storage zone fan, and starting the heat-dissipating fan so that an operation in which atmospheres in both the cold storage and freezing zones are simultaneously cooled is continued until a temperature or temperatures in the cold storage and/or freezing storage zone decreases to a value or values smaller than a predetermined value or values, respectively or until a predetermined period of time elapses after the power supply to the refrigerator, the control means thereafter executing a normal operation mode.

2. A refrigerator according to claim 1, wherein upon power supply to the refrigerator, the control means switches the switching valve so that the refrigerant flows through the second passage, starts the compressor, starts the cold storage zone fan, starts the heat-dissipating fan so that an operation in which the atmosphere in the freezing zone is cooled is continued until a temperature in the freezing zone drops to a value equal to or smaller than a predetermined value or until a predetermined period of time elapses after the power supply to the refrigerator, the control means thereafter switching the switching valve so that the refrigerant flows through both first and second passages, the control means further re-starting the cold storage zone fan so that the fan is driven at a high speed so that an operation in which the atmospheres in both of the cold storage and freezing zones are simultaneously cooled is continued until a temperature or temperatures in the cold storage and/or freezing storage zone decreases to a value or values smaller than a predetermined value or values, respectively or until a predetermined period of time elapses after the power supply to the refrigerator, the control means thereafter executing a normal operation mode.

3. A refrigerator according to claim 2, wherein the compressor is of a variable compressing performance type, and wherein in a case where the refrigerant is caused to flow simultaneously into both the first and second passages, the control means drives the compressor so that a low compressing performance is achieved when a sum of a difference between an actual temperature in the cold storage zone and a target temperature for the cold storage zone and a difference between an actual temperature in the freezing zone and a target temperature for the freezing zone is equal to or larger than a predetermined value, the control means driving the compressor so that a high compressing performance is achieved, when said sum is smaller than the predetermined value.

4. A refrigerator according to claim 2, wherein the heat-dissipating fan is of a variable rotational speed type and wherein in a case where the refrigerant is caused to flow simultaneously into both the first and second passages, the control means drives the heat-dissipating fan at a high speed when a sum of a difference between an actual temperature in the cold storage zone and a target temperature for the cold storage zone and a difference between an actual temperature in the freezing zone and a target temperature for the freezing zone is equal to or larger than a predetermined value, the control means driving the compressor at a low speed when said sum is smaller than the predetermined value.

5. A refrigerator according to claim 2, wherein in a case where the refrigerant is caused to flow simultaneously into both the first and second passages, the control means drives both the cold storage and freezing zone fans at respective low speeds when a sum of a difference between an actual temperature in the cold storage zone and a target temperature for the cold storage zone and a difference between an actual temperature in the freezing zone and a target temperature for the freezing zone is equal to or larger than a predetermined value, the control means driving both the cold storage and freezing zone fans at respective high speeds when said sum is smaller than the predetermined value.

6. A refrigerator according to claim 2, wherein the compressor is of a variable compressing performance type, and wherein when the refrigerant is caused to flow simultaneously into both the first and second passages, the control means drives the compressor so that a lower compressing performance is achieved than when the refrigerant is caused to flow into only the second passage.

7. A refrigerator according to claim 2, wherein the heat-dissipating fan is of a variable rotational speed type and wherein when the refrigerant is caused to flow simultaneously into both the first and second passages, the control means drives the heat-dissipating fan at a higher speed than when the refrigerant is caused to flow into only the second passage.

8. A refrigerator according to claim 2, wherein the control means drives both the cold storage and freezing zone fans at respective lower speeds when the refrigerant is caused to flow into both the first and second passages than when the refrigerant is caused to flow into only the second passage.

9. A refrigerator according to claim 2, further comprising an expansion valve provided between the condenser and the cold storage zone capillary tube so as to be capable of varying a mass flow of the refrigerant and a valve provided between the condenser and the freezing zone capillary tube, both valves being provided instead of the switching valve, and wherein during a period when the refrigerant is caused to flow into both the first and second passages, the control means opens the expansion valve so that a predetermined mass flow of the refrigerant is achieved, opens the valve provided between the condenser and the freezing zone capillary tube, drives the freezing zone fan at a high speed, and drives the cold storage zone fan at a low speed.

10. A refrigerator according to claim 2, further comprising a four-way valve having one entrance and three exits and provided for directing the refrigerant condensed by the condenser selectively to any one of the three exits thereof, instead of the switching valve, a first cold storage zone capillary tube provided between the first exit of the four-way valve and the cold storage zone evaporator, a second cold storage zone capillary tube provided between the second exit of the four-way valve and the cold storage zone evaporator, both cold storage capillary tubes being provided instead of said single cold storage capillary tube, and another freezing zone capillary tube provided between the third exit of the four-way valve and the freezing zone evaporator, instead of said freezing zone capillary tube, the first cold storage zone capillary tube having a higher throttling than the second cold storage zone capillary tube, and wherein the control means switches the four-way valve so that the refrigerant is directed to both first and third exits during a period when the refrigerant is caused to flow simultaneously into both the first and second passages, so that the refrigerant is directed to the second exit during a period when the refrigerant is caused to flow into only the cold storage zone evaporator, and so that the refrigerant is directed to the third exit when the refrigerant is caused to flow into only the third exit.

11. A refrigerator according to claim 2, wherein when a temperature in the cold storage or freezing zone is lower than a respective predetermined value at a time of power supply, the control means interrupts the compressor for a predetermined period of time and thereafter omits a starting sequence to execute the normal operating mode.

12. A refrigerator according to claim 2, wherein the control means omits a starting sequence to execute the normal operating mode when temperatures in the cold storage and freezing zones are equal to or higher than respective predetermined temperatures and an outside temperature is lower than a predetermined value.

13. A refrigerator according to claim 2, wherein the control means does not carry out quick cooling, ice making and defrosting operations during execution of a starting sequence, and retards execution of the quick cooling, ice making and defrosting operations until the starting sequence is completed.

14. A refrigerator according to claim 1, wherein the compressor is of a variable compressing performance type, and wherein in a case where the refrigerant is caused to flow simultaneously into both the first and second passages, the control means drives the compressor so that a low compressing performance is achieved when a sum of a difference between an actual temperature in the cold storage zone and a target temperature for the cold storage zone and a difference between an actual temperature in the freezing zone and a target temperature for the freezing zone is equal to or larger than a predetermined value, the control means driving the compressor so that a high compressing performance is achieved, when said sum is smaller than the predetermined value.

15. A refrigerator according to claim 1, wherein the heat-dissipating fan is of a variable rotational speed type and wherein in a case where the refrigerant is caused to flow simultaneously into both the first and second passages, the control means drives the heat-dissipating fan at a high speed when a sum of a difference between an actual temperature in the cold storage zone and a target temperature for the cold storage zone and a difference between an actual temperature in the freezing zone and a target temperature for the freezing zone is equal to or larger than a predetermined value, the control means driving the compressor at a low speed when said sum is smaller than the predetermined value.

16. A refrigerator according to claim 1, wherein in a case where the refrigerant is caused to flow simultaneously into both the first and second passages, the control means drives both the cold storage and freezing zone fans at respective low speeds when a sum of a difference between an actual temperature in the cold storage zone and a target temperature for the cold storage zone and a difference between an actual temperature in the freezing zone and a target temperature for the freezing zone is equal to or larger than a predetermined value, the control means driving both the cold storage and freezing zone fans at respective high speeds when said sum is smaller than the predetermined value.

17. A refrigerator according to claim 1, further comprising an expansion valve provided between the condenser and the cold storage zone capillary tube so as to be capable of varying a mass flow of the refrigerant and a valve provided between the condenser and the freezing zone capillary tube, both valves being provided instead of the switching valve, and wherein during a period when the refrigerant is caused to flow into both the first and second passages, the control means opens the expansion valve so that a predetermined mass flow of the refrigerant is achieved, opens the valve provided between the condenser and the freezing zone capillary tube, drives the freezing zone fan at a high speed, and drives the cold storage zone fan at a low speed.

18. A refrigerator according to claim 1, further comprising a four-way valve having one entrance and three exits and provided for directing the refrigerant condensed by the condenser selectively to any one of the three exits thereof, instead of the switching valve, a first cold storage zone capillary tube provided between the first exit of the four-way valve and the cold storage zone evaporator, a second cold storage zone capillary tube provided between the second exit of the four-way valve and the cold storage zone evaporator, both cold storage capillary tubes being provided instead of said single cold storage capillary tube, and another freezing zone capillary tube provided between the third exit of the four-way valve and the freezing zone evaporator, instead of said freezing zone capillary tube, the first cold storage zone capillary tube having a higher throttling than the second cold storage zone capillary tube, and wherein the control means switches the four-way valve so that the refrigerant is directed to both first and third exits during a period when the refrigerant is caused to flow simultaneously into both the first and second passages, so that the refrigerant is directed to the second exit during a period when the refrigerant is caused to flow into only the cold storage zone evaporator, and so that the refrigerant is directed to the third exit when the refrigerant is caused to flow into only the third exit.

19. A refrigerator according to claim 1, wherein when a temperature in the cold storage or freezing zone is lower than a respective predetermined value at a time of power supply, the control means interrupts the compressor for a predetermined period of time and thereafter omits a starting sequence to execute the normal operating mode.

20. A refrigerator according to claim 1, wherein the control means omits a starting sequence to execute the normal operating mode when temperatures in the cold storage and freezing zones are equal to or higher than respective predetermined temperatures and an external temperature is equal to or lower than a predetermined value.

21. A refrigerator according to claim 1, wherein the control means does not carry out a quick cooling, ice making and defrosting operations during execution of a starting sequence, and retards execution of the quick cooling, ice making and defrosting operations until the starting sequence is completed.

* * * * *